(12) United States Patent
Yamagiwa et al.

(10) Patent No.: US 12,220,004 B2
(45) Date of Patent: Feb. 11, 2025

(54) INFORMATION PROCESSING DEVICE, METHOD, AND PROGRAM

(71) Applicant: The Pokemon Company, Tokyo (JP)

(72) Inventors: Junichi Yamagiwa, Tokyo (JP); Marina Ohnaro, Tokyo (JP)

(73) Assignee: The Pokemon Company, Tokyo (JP)

( * ) Notice: Subject to any disclaimer, the term of this patent is extended or adjusted under 35 U.S.C. 154(b) by 357 days.

(21) Appl. No.: 17/841,678

(22) Filed: Jun. 16, 2022

(65) Prior Publication Data

US 2022/0308536 A1   Sep. 29, 2022

Related U.S. Application Data

(63) Continuation of application No. PCT/JP2021/000322, filed on Jan. 7, 2021.

(30) Foreign Application Priority Data

Mar. 10, 2020 (JP) ................................ 2020-041387

(51) Int. Cl.
*A41D 1/00* (2018.01)
(52) U.S. Cl.
CPC .................... *A41D 1/002* (2013.01)
(58) Field of Classification Search
CPC ........ A63H 3/00; A63H 3/06; A63H 2200/00; A63H 3/28; A63J 5/00; A63J 7/005
See application file for complete search history.

(56) References Cited

U.S. PATENT DOCUMENTS

| | | | |
|---|---|---|---|
| 2009/0203286 A1* | 8/2009 | Murayama | A63H 33/00 446/28 |
| 2014/0289057 A1* | 9/2014 | Kowal | G06Q 50/01 705/14.73 |
| 2016/0001193 A1* | 1/2016 | Eck | A63J 7/005 446/26 |
| 2019/0049906 A1* | 2/2019 | Bennett | A41D 1/002 |
| 2019/0259066 A1* | 8/2019 | Asukai | H04W 4/21 |
| 2022/0000192 A1* | 1/2022 | Musser | A63J 5/00 |
| 2022/0054948 A1* | 2/2022 | Yeh | A61B 5/0816 |

FOREIGN PATENT DOCUMENTS

| | | |
|---|---|---|
| JP | 2009-213874 A | 9/2009 |
| JP | 2012-226455 A | 11/2012 |
| WO | 2018/087968 A1 | 5/2018 |

OTHER PUBLICATIONS

International Search Report and Written Opinion mailed on Apr. 6, 2021, received for PCT Application PCT/JP2021/000322, filed on Jan. 7, 2021, 8 pages including English Translation.
English Translation of Written Opinion mailed on Apr. 6, 2021, in corresponding PCT Application PCT/JP2021/000322, 3 pages.

* cited by examiner

*Primary Examiner* — Mirza F Alam
(74) *Attorney, Agent, or Firm* — XSENSUS LLP

(57) ABSTRACT

An information processing device includes processing circuitry configured to detect that a user holding a specific item or a user associated with specific information is located around a costume; and a cause a performance unit of the costume to perform a specific performance in response to the detection or notify an actor wearing the costume of information on the user associated with the specific information.

16 Claims, 14 Drawing Sheets

Fig. 8

SENSING RESULT DATABASE (381)

| SENSOR ID | DATE AND TIME | SENSING DATA | USER SPECIFYING RESULT (USER NAME, POSITION, AND REACTION) | GOODS SPECIFYING RESULT | COSTUME SPECIFYING RESULT (COSTUME ID, POSITION, AND ACTOR ID) |
|---|---|---|---|---|---|
| #0001 | 10:00:00, SEPTEMBER 9, 2020 | Img001 | (User001,X1, Y1, Em01), (User002,X2,Y2,Em02), ... | (User001, Gds001), ... | (Cos001, P1, Q1, Act001), ... |
| #0002 | 10:00:00, SEPTEMBER 9, 2020 | Img002 | - | - | (Cos011, P2, Q2, Act011), ... |
| ... | ... | ... | ... | ... | ... |

NOTIFICATION HISTORY (382)

| DATE AND TIME | CONTENT OF PERFORMANCE INSTRUCTION TO COSTUME | CONTENT OF NOTIFICATION TO TERMINAL OF ACTOR | REACTION (EMOTIONS) |
|---|---|---|---|
| 10:00:00, SEPTEMBER 9, 2020 | (Cos001, Pfm001), ... | - | Good |
| 10:00:00, SEPTEMBER 9, 2019 | - | (Act001, ment001), ... | Good |
| ... | ... | ... | ... |

Fig. 9

| USER INFORMATION ||||||||
|---|---|---|---|---|---|---|---|
| USER ID | USER NAME | USER LEVEL | POSSESSED CHARACTER | POSSESSED ITEM | GAME PLAY HISTORY | GAME PLAY TIME | PAID VIRTUAL CURRENCY |
| #11AA22BB | AZX123 | 66 | #C001, #C002, ... | #M001, #M002, ... | #Qst001, #Mlt002, ... | 12000 | 4500 |
| #6D7E8F99 | KKLLMM | 22 | 70 | 80 | ... | 6000 | 0 |
| ... | ... | ... | ... | ... | ... | ... | ... |

981

| FRIEND LIST |||||
|---|---|---|---|---|
| USER 1 | USER 2 | FRIEND REGISTRATION DATE | MULTI-PLAY HISTORY | MESSAGE TRANSMISSION AND RECEPTION HISTORY |
| #11AA22BB | #6D7E8F99 | JUNE 6, 2020 | ... | ... |
| #6D7E8F99 | #RRTT5566 | AUGUST 8, 2020 | ... | ... |
| ... | ... | ... | ... | ... |

984

INFORMATION PROCESSING DEVICE, METHOD, AND PROGRAM

CROSS-REFERENCE TO RELATED APPLICATIONS

This is a Bypass Continuation of National Stage Application based on PCT/JP2021/000322, filed Jan. 7, 2021, which claims priority to JP 2020-041387, filed Mar. 10, 2020, the entire contents of each are incorporated herein by its reference.

TECHNICAL FIELD

The present disclosure relates to an information processing device, method, and program.

BACKGROUND

Performance is performed by costumes at theme parks, event spaces, or the like. For example, Japanese Patent Application Publication No. 2012-226455 (PTL 1) describes that a monitor is included outside a costume to attract customers. Specifically, PTL 1 describes that the costume includes an IC reader/writer so that a URI, of a site can be transmitted by a mobile terminal being held to the IC reader/writer.

[PTL 1] Japanese Patent Application Publication No. 2012-226455

SUMMARY

Technical Problems

It is necessary not only to view a performance in a costume or for a user to capture the performance in the costume in a photograph, but also to provide other experiences to a user who enjoys content of a character of the costume or the like.

The present disclosure provides a technology for further improving the experience of a user who enjoys content of a character such as that of a costume.

Solutions to Problems

According to an embodiment, an information processing device including a control unit is provided. The control unit functions as a detection means configured to detect that a user holding a specific item or a user associated with specific information is located around a costume; and a performance control means configured to cause a performance unit of the costume to perform a specific performance in response to the detection and notify an actor wearing the costume of information on a user associated with the specific information.

According to the present disclosure, it is possible to further improve experience of a user.

BRIEF DESCRIPTION OF DRAWINGS

FIG. 8 is a diagram illustrating a data structure of a sensing result database 381 and a notification history 382.

FIG. 9 is a diagram illustrating a data structure of user information 181 and a friend list 184 stored in a game server 9.

DETAILED DESCRIPTION

Figure 1:
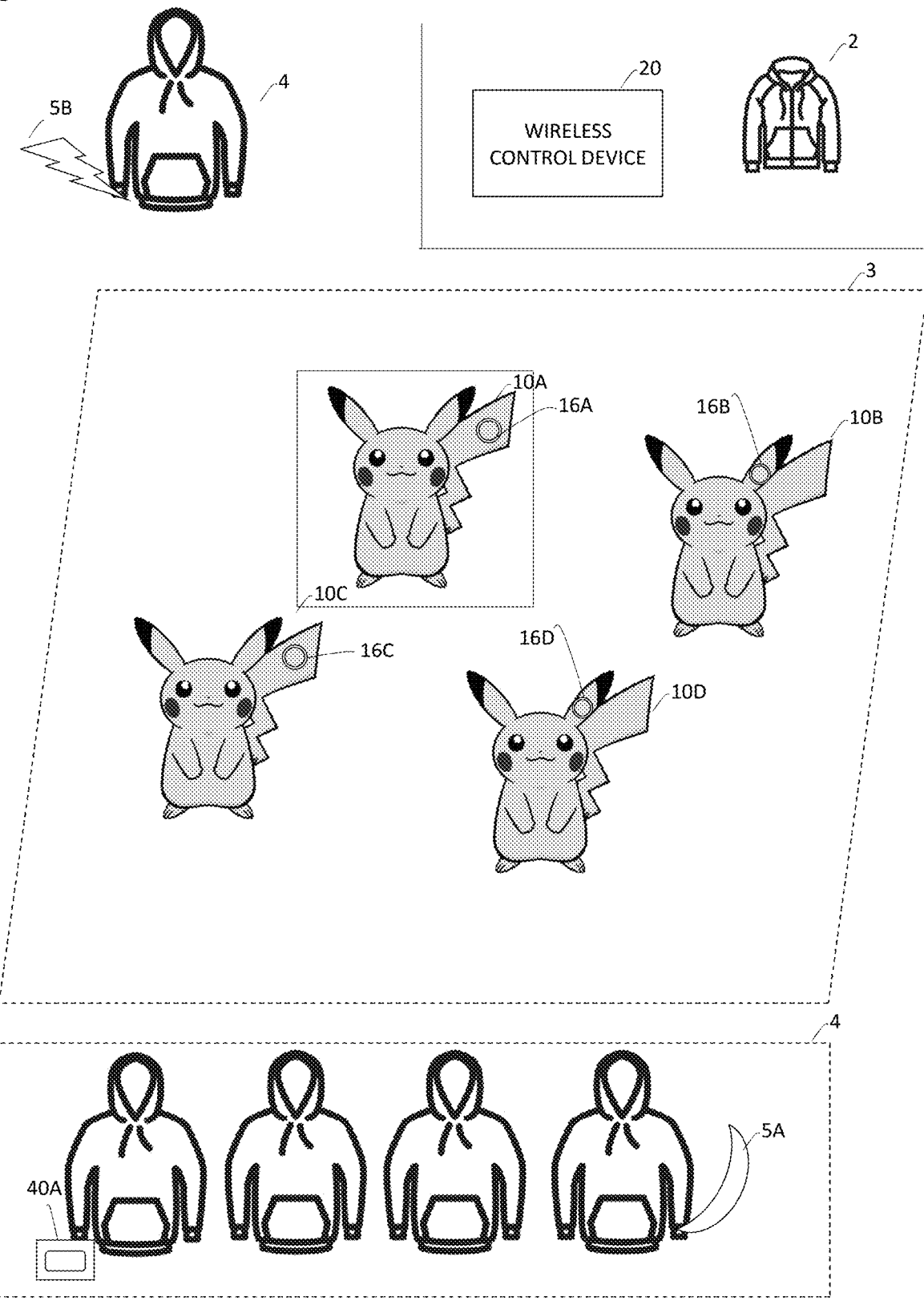
FIG. 1 is a diagram illustrating an overall configuration of a performance control system 1.

Hereinafter, the present disclosure will be described with reference to the drawings. In the following description, the same parts are denoted by the same reference signs. Names and functions thereof are the same. Therefore, detailed description of them will not be repeated.

First Embodiment

In the following embodiment, an example in which a method of executing a performance in costume with a light emitting unit or the like according to goods held by a user when a show with one or a plurality of costumes, a photo-shoot involving a costume and a user, and the like are performed at a theme park or the like is controlled, and an example in which a notification indicating that the user holding goods has approached a performer (actor) wearing a costume is performed will be described.

Goods are related to a character of the costume. For example, the goods may be a stuffed animal of the character, daily necessities such as a towel on which the character is printed, a hat that reminds a user of the character (for example, a characteristic hat worn by the character), clothes such as a shirt (including a shirt on which the character is printed), articles to be used by the character (equipment such as weapons and armor), food, or the like. The goods can be related to content in which the costume appears. For example, a title of a game, animation, light novel, manga, or the like in which a character appears may be displayed. As described above, some goods may be worn on a body of the user (a hat, a shirt, or the like), some goods may be held in the hand by the user (a stick, a ball, or the like), or some goods may be not worn or held by the user (a snack or the like).

Users can purchase goods inside and outside a theme park or the like. For example, the goods can be goods that could be purchased at a theme park or the like in the past, goods that can be purchased by the user entering the theme park or the like in a period of time in which the user is actually visiting the theme park or the like, or goods that can be purchased at an ecommerce (EC) site.

As described above, it is possible to provide an experience obtained by the user holding goods by controlling the performance of the performance unit included in the costume (light emission of LEDs or the like mounted on the costume) according to the article held by the user. For example, in a case in which the user holds goods related to the character of the costume, a specific performance is performed by the performance unit of the costume so that experience that the user holding the goods can obtain from the costume can be further enriched, as compared with a performance of a light emitting unit of the costume in a case in which a user not holding goods is located around the costume. Further, in a terminal device of a performer wearing the costume, when a user holding specific goods is located nearby (for example, goods related to a character (for example, favorite food of the character)), the terminal device of the performer is notified of the fact, making it possible for the performer to provide a special movement to the user holding the goods.

<1 Configuration Diagram of Entire Performance Control System>

Hereinafter, the performance control system 1 will be specifically described.

FIG. 1 is a diagram illustrating an overall configuration of the performance control system 1.

As illustrated in FIG. 1, the performance control system 1 is a system for controlling performance of a show or event (hereinafter also referred to as an "event or the like") performed at an event venue 3. The performance control system 1 includes a plurality of costumes 10 and a wireless control device 20.

In the illustrated example, the operator 2 who operates the wireless control device 20 determines content of the performance of the plurality of costumes 10 in the event venue 3, and controls a performance (a light emitting pattern, or the like) by a performance unit 16 of the costume 10. Further, the operator 2 controls the performance of the wireless control device 20 while observing the reaction of the audience user 4.

The event or the like expresses a world view of content such as a game, a manga, an animation, a novel, or a drama. The event or the like may be held outdoors or indoors. A performance constituting the event or the like includes appearing in the costume 10 indicating a character appearing in content. The costume 10 has a structure in which the performer can move a movable part such as a limb of the costume 10 from the inside of the costume 10. For example, the costume 10 has a structure in which, when the performer wears the costume 10, a limb of the performer can be inserted into a part of the limb of the costume 10. When the costume 10 has a tail and the like, the performer may be able to operate the tail and the like.

The performance of the event or the like includes, for example, a plurality of costumes 10 (four costumes 10 including costumes 10A, 10B, 10C, and 10D are illustrated) appearing, the plurality of costumes 10 moving by themselves (that is, performer wearing a costume 10 walking), and the performer moving by riding on a moving object such as a ship or a vehicle, as illustrated in the figure. When the plurality of costumes 10 are made to appear at the event or the like, costumes having various appearances may be made to appear, or a plurality of costumes having substantially the same appearance may be made to appear. For example, a plurality of costumes imitating an appearance of a virtual character appearing in content may be made to appear. Here, when a plurality of costumes having substantially the same appearance are made to appear, the performance units mounted on the respective costumes may differ. Further, costumes imitating the appearance of a virtual character and costumes imitating appearances of characters related to such a character (for example, a costume imitating an appearance of a character obtained by evolving or transforming such a character, or a character having, for example, a human relationship with such a character) may be made to appear at the event or the like. The plurality of costumes that are made to appear in these events or the like are managed separately. As will be described herein, in one or a plurality of devices included in the performance control system 1, each costume is managed in association with information for identifying each costume (costume ID). Each device manages information such as information on a type of character, an identification number indicating an individual difference in a case in which characters are of the same type (for example, when there are a plurality of costumes indicating characters "A", a serial number such as an identification number "1" is imparted to the costume of each character "A"), a time when the costume has been produced, a size of the costume, a disposition pattern of the performance unit 16 included in the costume, and a performance of the performance unit 16, in association with information for identifying each costume. The performance control system 1 acquires the information for identifying each costume that performs performance on the basis of a sensing result of the camera or the like installed in the event venue 3 or the like (an example in which a result of identifying the costume is held in the sensing result database 381 will be described herein). A processing server 30 (to be described herein), transmits an instruction for causing each costume to perform a performance to the wireless control device 20 or the like on the basis of the information for identifying the costume.

The performance using the costume 10 includes a visual performance using light, and an auditory performance using sound. For example, the performance includes a light emitting member such as an LED being mounted on the costume 10 and a light emitting pattern being controlled according to music. In the illustrated example, the costume 10 includes a performance unit 16 (performance units 16A, 16B, 16C, and 16D) as the light emitting member. For example, the performance unit 16 may be provided in a head part, an arm part, a leg part, a body part, and a tail part of the costume 10.

A method of performing a performance using light is not limited to light emission using a light emitting diode (LED) and light with high linearity such as laser light may be radiated. Further, when a performance using sound is performed as a method of performing a performance using something other than light, the costume 10 may perform a dance or the like according to background music (BGM) or provide sound that can be heard at a specific position by a speaker having high directivity.

The wireless control device 20 is a device for controlling the performance of the plurality of costumes 10. The operator 2 operates the wireless control device 20. The operator 2 controls the performance of each of the plurality of costumes 10 by designating each of the plurality of costumes 10 and a performance pattern.

The audience user 4 is a user who enjoys the event or the like held in the event venue 3 by visiting the event venue 3. The event or the like may be held for free with regard to entrance or exit to or from the event venue 3, or the event or the like may be held for a fee with restrictions on entrance or exit to or from the event venue 3. For example, when the event or the like is held for a fee, the audience user 4 can view the event or the like to be held in the event venue 3 by obtaining a ticket for the event or the like in advance and performing reception processing in the event venue 3. That is, the performance control system 1 may include a reception system for recording that the audience user 4 has visited.

The audience user 4 holds goods 5A and goods 5B (which may be hereinafter collectively referred to as "goods 5") and the like. For example, the audience user 4 purchases the goods 5A, the goods 5B, and the like at a place in which the goods 5A, the goods 5B, and the like can be purchased around the event venue 3. The goods 5 may be held by a part of a body of the audience user 4 (held by the hand), or may be worn on the body of the user such as a head, a neck, an arm, a leg, and a body part. The goods 5 may include a communication unit capable of communicating with other devices, or may not include a communication unit. For example, the communication unit may be a unit that transmits or receives signals using an antenna or the like, or may be a light reception unit that receives light (infrared rays or the like) emitted from a light emitting source. That is, the goods 5 may or may not have a configuration in which communication is performed by the light emitting unit, the light reception unit, and the like.

The operator 2 determines the content of the performance of the plurality of costumes 10 while checking the goods 5A, the goods 5B, and the like held by the audience user 4, and controls the performance of the costume 10 by the performance unit 16.

Further, the audience user 4 holds the terminal device 40A. The audience user 4 can also operate his/her terminal device 40A to cause a game based on a game program to progress. The operator 2 performs the performance by the performance unit 16 of the costume 10 or the notification to the performer wearing the costume 10 while checking information on users around the event venue 3 on a display or the like. For example, the information on the user can be displayed on the display of the terminal device of the operator by a terminal device of the operator and the terminal device 40A held by the user around the event venue 3 communicating with each other through short-range wireless communication or the like.

Figure 2:
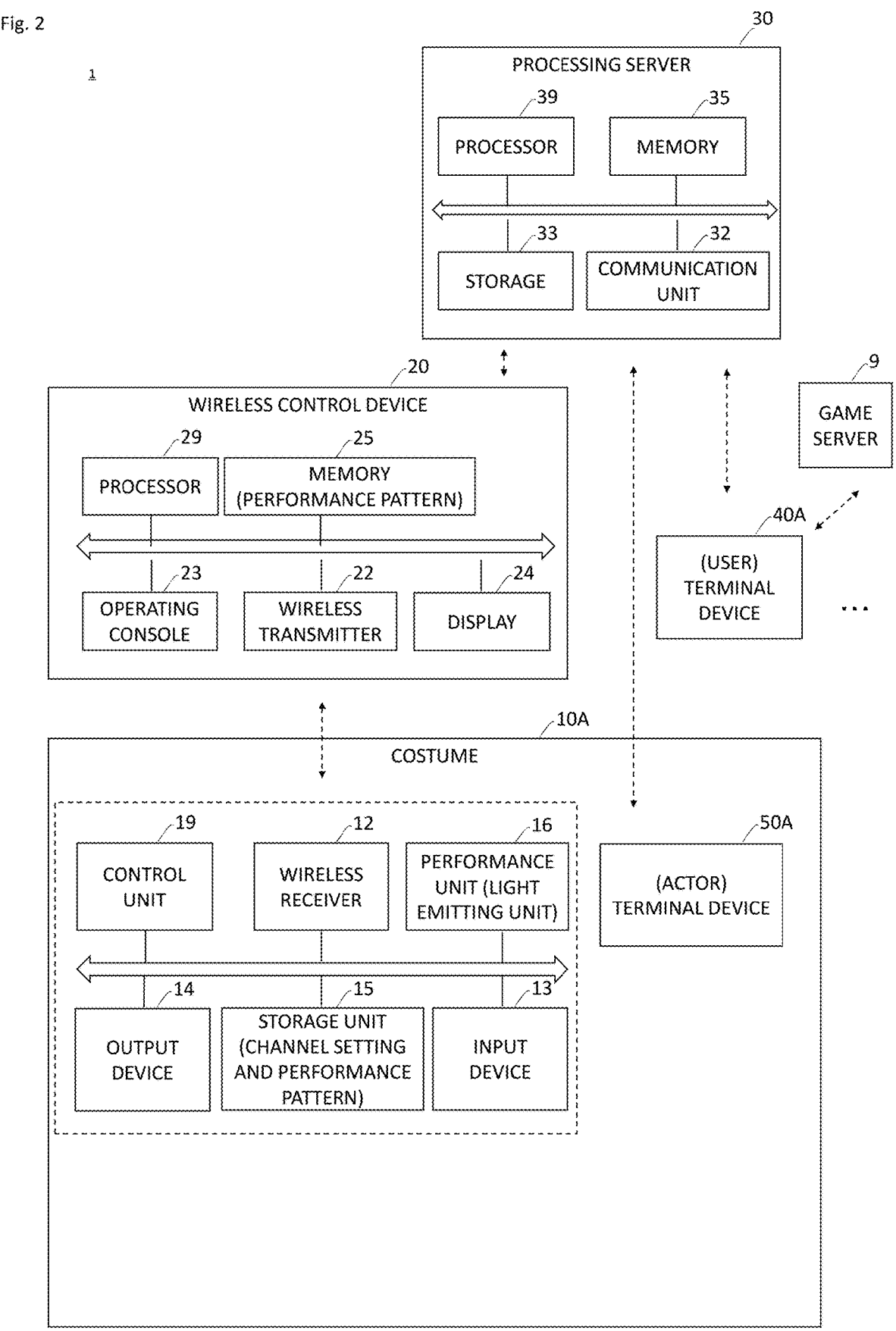
FIG. 2 is a diagram illustrating the overall configuration of the performance control system 1.

FIG. 2 is a diagram illustrating an overall configuration of the performance control system 1. In the example of FIG. 2, the costume 10A is shown as a part of the plurality of costumes 10. The terminal device 40A of the audience user 4 communicates with the processing server 30 and the game server 9. In the present embodiment, each device (a terminal device, a server, or the like) can be ascertained as an information processing device. That is, a collection of the respective devices can be ascertained as one "information processing device", and the performance control system 1 may be formed as a collection of a plurality of devices. A method of distributing a plurality of functions required for realization of the performance control system 1 according to the present embodiment to one or a plurality of pieces of hardware can be appropriately determined in consideration of, for example, a processing capacity of each piece of hardware and/or a specification required for the performance control system 1.

The processing server 30 acquires information on users around the costume 10 by communicating with the terminal device 40A. The processing server 30 determines performance content of the costume 10 and transmits the performance content to the wireless control device 20.

The game server 9 is a device for providing the game based on the game program that operates on the terminal device 40A. The game server 9 holds information of each player.

The costume 10A includes a wireless receiver 12, an input device 13, an output device 14, a storage unit 15, the performance unit 16, and a control unit 19.

The performer wearing the costume 10A can operate the terminal device 50A provided inside the costume 10A.

Because the costume 10A communicates with another wireless device, the wireless receiver 12 performs modulation or demodulation processing for receiving a signal via an antenna. The wireless receiver 12 may have a configuration for transmitting a radio signal. The wireless receiver 12 is a communication module including a tuner, a received signal strength indicator (RSSI) calculation circuit, a cyclic redundancy check (CRC) calculation circuit, a high frequency circuit, and the like. The wireless receiver 12 performs modulation or demodulation, or frequency conversion on the radio signal transmitted or received by the costume 10A, and supplies the received signal to the control unit 19 or the like.

The input device 13 is a device for receiving an operation from a performer wearing the costume 10A, and is, for example, a physical button.

The output device 14 is a device for outputting information to the performer wearing the costume 10A or the audience user 4. For example, the output device 14 includes a display, a speaker, or the like. For example, when the performance pattern of the costume 10A is changed under the control of the wireless control device 20, a voice indicating that the performance pattern has been changed is output from the speaker to a performer of the costume 10A. Further, for example, predetermined information is presented to the audience user 4 around the costume 10A through the display.

The storage unit 15 includes, for example, a dynamic random access memory (DRAM), a flash memory, or the like, and stores data and programs to be used by the costume 10A. In a certain aspect, the storage unit 15 stores various settings for performing the performance by the performance unit 16. The storage unit 15 stores, for example, settings of the light emitting pattern of the light emitting unit constituting the performance unit 16. The costume 10A updates the settings of the light emitting pattern each time the costume 10A receives a designation of the light emitting pattern from the wireless control device 20.

The control unit 19 controls an operation of the costume 10A by reading the program stored in the storage unit 15 and executing instructions included in the program. The control unit 19 is, for example, a processor.

Although not illustrated, the costume 10A holds a power supply source such as a battery, and supplies power to the control unit 19, the performance unit 16, and the like. For example, the performer wearing the costume 10A may be able to switch a mode of supplying power to the performance unit 16 and the like by performing a predetermined operation. For example, the performer may be able to perform an operation for a power saving mode before the performance of the event or the like starts, and release of the power saving mode when the performance of the event or the like starts. Further, supply of power of the costume 10A may be able to be controlled without the operation of the performer under the control of the wireless control device 20. For example, the costume 10A may switch a power consumption mode in response to the reception of a signal from the wireless control device 20.

The wireless control device 20 includes a wireless transmitter 22, an operating console 23, a display 24, a storage unit 25, and a control unit 29.

Because the wireless control device 20 communicates with another wireless device, the wireless transmitter 22 performs modulation or demodulation processing for transmitting a signal via the antenna. The wireless transmitter 22 may have a configuration for receiving a radio signal. The wireless transmitter 22 is a communication module including a tuner, an RSSI calculation circuit, a CRC calculation circuit, a high frequency circuit, and the like. The wireless transmitter 22 performs modulation and demodulation or frequency conversion on a radio signal transmitted or received by the wireless control device 20, and gives the received signal to the control unit 29 or the like.

The operating console 23 is a device for receiving an operation from the operator 2. Although details will be described herein, the operating console 23 receives an operation for controlling the performance pattern of each of the plurality of costumes 10. For example, when the wireless control device 20 assigns a wireless channel to each of the plurality of costumes 10 for a wireless channel that can be used for transmission of a radio signal, the operator 2 specifies a range of the wireless channel so that the operator 2 can designate the performance pattern of the costume 10 to be controlled.

The display 24 is a device for presenting information to the operator 2.

The storage unit 25 stores a performance pattern for the performance unit 16 of the costume 10 performing a performance. For example, when the performance unit 16 includes a light emitting unit, the storage unit 25 stores information defining a timing at which the light emitting unit emits light as the performance pattern.

The control unit 29 controls an operation of the wireless control device 20 by reading a program stored in the storage unit 25 and executing instructions included in the program. The control unit 29 is, for example, a processor. In response to an input operation of the operator 2 to the operating console 23, the control unit 29 performs processing for generating a radio signal for controlling the performance of each of the plurality of costumes 10, and transmitting the radio signal to each of the costumes 10. The control unit 29 generates a video signal on the basis of content displayed on the display 24, and causes the display 24 to display the video on the basis of the generated video signal.

The processing server 30 includes a communication unit 32, a storage 33, a memory 35, and a processor 39. The communication unit 32 performs, for example, modulation or demodulation processing for the processing server 30 communicating with other devices. The storage 33 is used as a storage area for holding a database or the like in the processing server 30. The memory 35 is used as a temporary storage area for the processing server 30 performing processing on the basis of the program. The processor 39 controls an operation of the processing server 30 by reading the program from the memory 35 or the like and executing the instructions included in the program.

Figure 3:
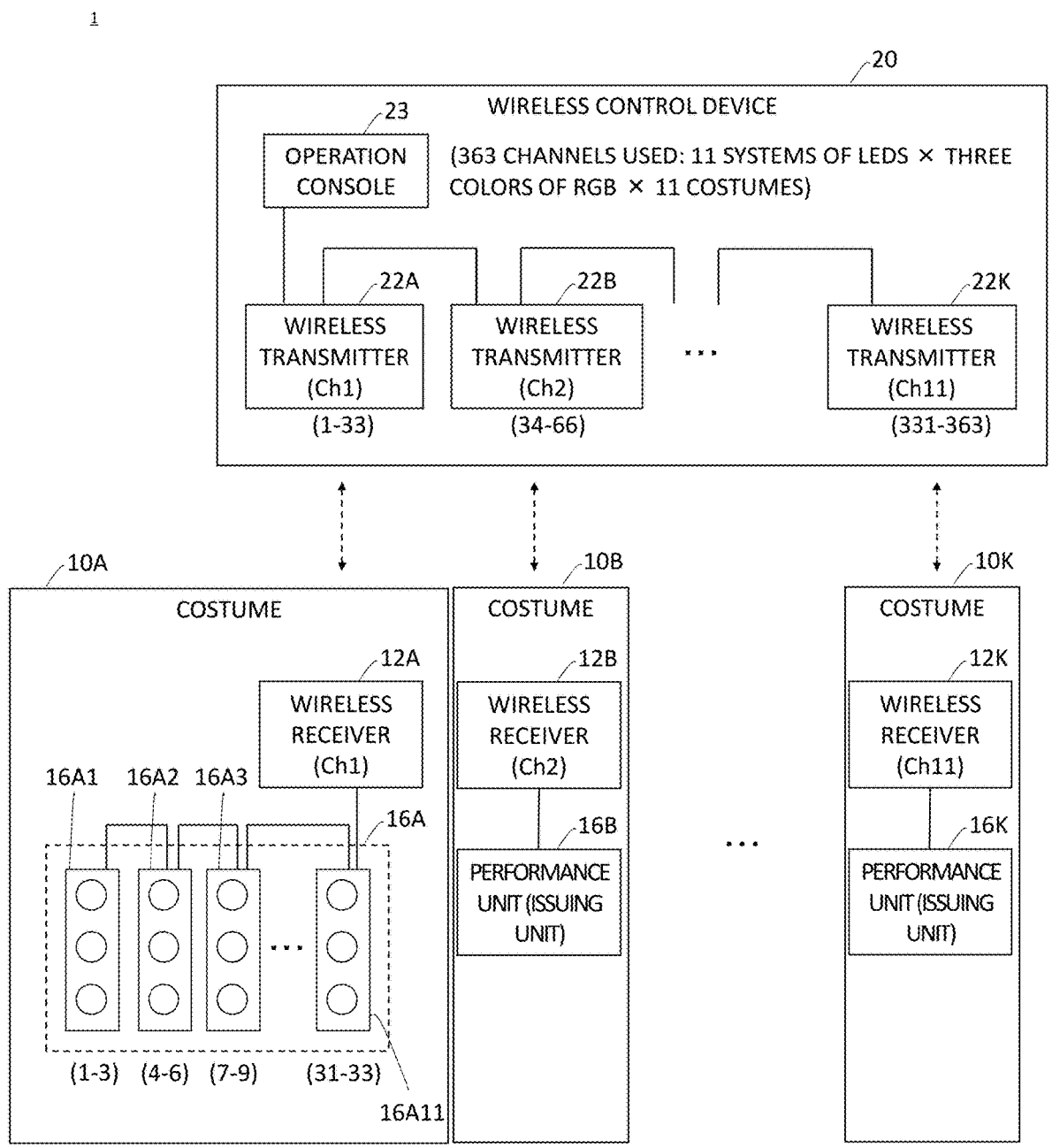
FIG. 3 is a diagram illustrating details of a configuration for a wireless control device 20 controlling a performance pattern of a plurality of costumes 10.

FIG. 3 is a diagram illustrating details of a configuration for the wireless control device 20 controlling the performance patterns of the plurality of costumes 10.

The costume 10 and the wireless control device 20 have a device configuration corresponding to a predetermined communication protocol in order to enable control using a radio signal. In the present embodiment, 11 costumes 10 are made to appear (the costumes 10A, 10B, . . . , 10K).

The wireless control device 20 includes a plurality of wireless transmitters 22 (radio transmitters 22A, 22B, . . . , 22K) corresponding to the respective costumes 10. In the present embodiment, the wireless control device 20 can use a maximum of 512 channels, and uses 363 channels among the 512 channels.

The costume 10A includes a wireless receiver 12A and the performance unit 16A. The performance unit 16A includes a plurality of light emitting units (light emitting units 16A1, 16A2, . . . ). Each light emitting unit includes a plurality of monochromatic light emitting members. For example, each light emitting unit may be configured of an LED that emits red, an LED that emits blue, and an LED that emits green so that an arbitrary color can be expressed by mixing three colors (RGB). In the illustrated example, the costume 10A includes 11 systems of light emitting units (light emitting units 16A1, A2, . . . , A11) as the performance unit 16A. Each light emitting unit includes three light emitting members, and three channels are assigned in correspondence to the respective light emitting members. Therefore, 33 channels (11 systems of light emitting units and 3 channels for each light emitting unit) are assigned to the costume 10A (first to 33rd channels).

Similarly, the costume 10B includes a wireless receiver 12B and a performance unit 16B. The performance unit 16B includes 11 systems of light emitting units. 33 channels are assigned to the costume 10B (34-th to 66-th channels), as in the case of the costume 10A. Similarly, 33 channels are assigned to the costume 10K (a 331-st channel to a 363-rd channel). The wireless receiver 12 receives the radio signal transmitted from the wireless control device 20 and acquires a signal of the channel assigned to the own device.

In the wireless control device 20, the operating console 23 and each of the plurality of wireless transmitters 22 are connected by a daisy chain. Each of the operating console 23 and the plurality of wireless transmitters 22 includes a connector for receiving an input of a signal, and a connector for outputting a signal, and each connector is connected by a cable.

The wireless control device 20 stores an 8-bit code corresponding to the 512 channels in the storage unit 25. When the operator 2 operates the operating console 23, the 8-bit code stored in the storage unit 25 is updated. The control unit 29 of the wireless control device 20 generates a transmission signal on the basis of the 8-bit code stored in the storage unit 25. The transmission signal includes, for example, a start bit and a stop bit. The wireless control device 20 sequentially transmits a radio signal to the plurality of costumes 10 on the basis of the code stored in the storage unit 25.

The wireless control device 20 may transmit the next signal before ending transmission of signals of the 512 channels. In the present embodiment, because 363 channels among the 512 channels are used in order to control 11 costumes 10, the next signal may be transmitted in response to ending of transmission of signals of the 363 channels.

Further, a cycle of the signal transmitted from the wireless control device 20 to the costume 10 may be changed according to an increase or decrease in the number of the plurality of costumes 10. For example, when the number of costumes 10 entering the event venue 3 is reduced from 11 to 5, the number of channels required for performance of the costumes 10 is 165 (for example, first to 165-th channels). The wireless control device 20 may change the cycle at which the radio signal is transmitted to the costume 10 according to the operation of the operator 2. This makes it possible to switch the performance pattern of the costume 10 in a shorter period of time in a case in which the performance pattern of the costume 10 is switched according to an operation of the operator 2.

<Operation>

Figure 4:
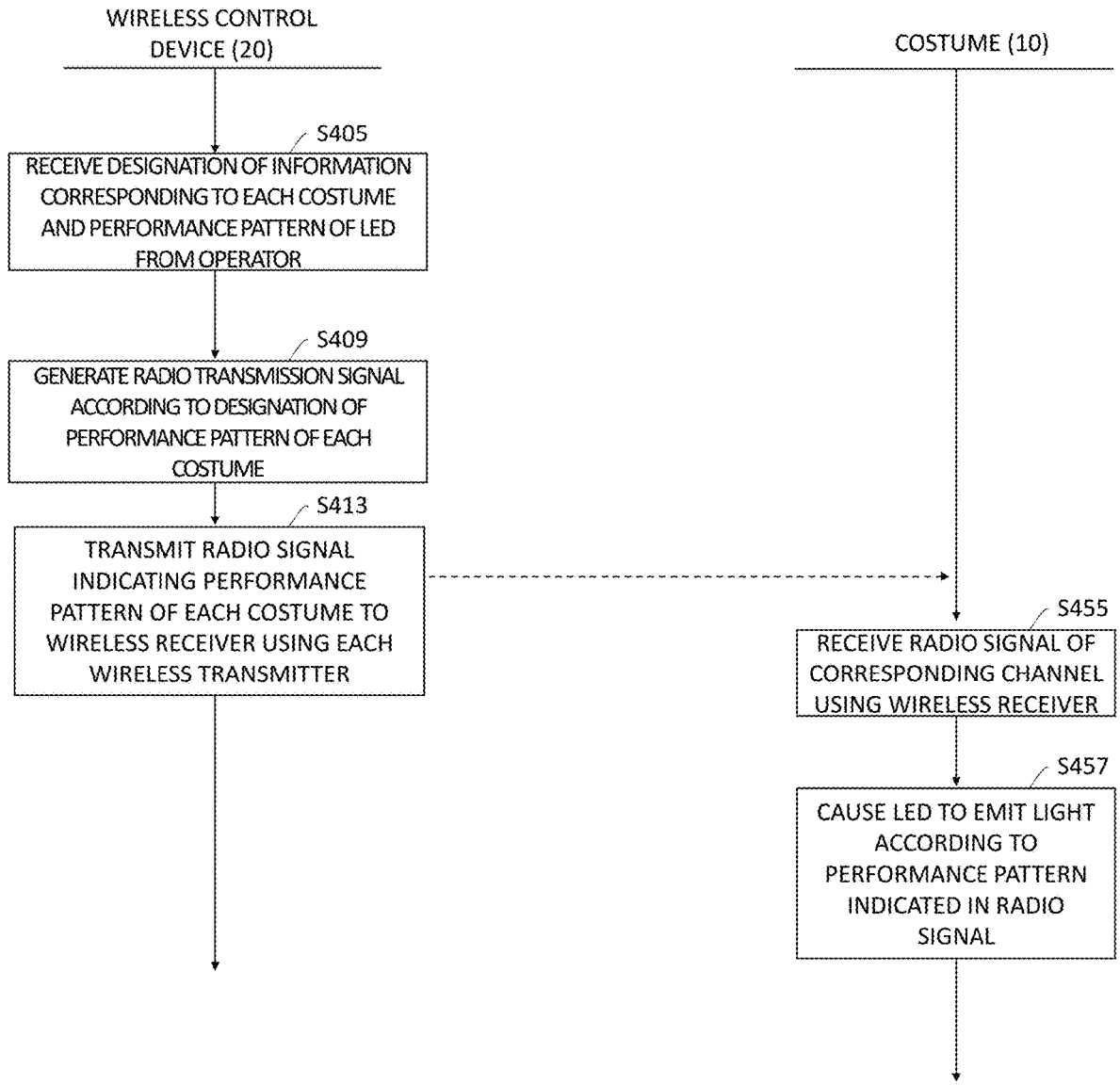
FIG. 4 is a flowchart illustrating processing in which the wireless control device 20 controls a performance pattern of the costume 10.

FIG. 4 is a flowchart illustrating processing of the wireless control device 20 controlling the performance pattern of the costume 10. In the following example, the operator 2 operates the wireless control device 20 at any time to control the performance of each costume 10. The operator 2 determines performance content (the light emitting pattern or the like) of the costume 10 while checking the audience user 4 of the event venue 3, the goods 5A held by the audience user, and a reaction (surprise or the like) after the audience user 4 experiences the performance of the costume 10, and operates the wireless control device 20 to cause the performance unit 16 of each costume to perform a performance.

In step S405, the wireless control device 20 receives a designation of information corresponding to each costume 10 and a performance pattern of the LED constituting the performance unit 16 from the operator 2 via the operating console 23. The wireless control device 20 updates a code for generating the radio signal to be transmitted to the wireless receivers 12 of the plurality of costumes 10 according to a designation of the user.

In step S409, the wireless control device 20 generates a radio signal according to the designation of the performance pattern of each costume 10. The wireless control device 20 generates a signal of 363 channels on the basis of the code stored in the storage unit 25.

In step S413, the wireless control device 20 transmits a radio signal indicating the performance pattern of each costume 10 to the wireless receiver 12 (12A, 12B, . . . ) using the wireless transmitter 22 (22A, 22B, . . . ).

In step S455, each costume 10 receives the radio signal of the corresponding channel using the wireless receiver 12.

In step S5457, each costume 10 causes the light emitting unit (LED) of the performance unit 16 to emit light according to the performance pattern indicated in the radio signal.

For example, when the wireless control device 20 performs a performance of blinking the light emitting unit of the specific costume 10 as the performance pattern, the wireless control device 20 alternately generates a radio signal for causing the light emitting unit of the specific costume 10 to emit light and a radio signal for not causing the light emitting unit to emit light in the channel corresponding to the specific costume 10, and transmits the radio signals to the costume 10. The costume 10 may cause the light emitting unit to blink by causing the light emitting unit to emit light or not causing the light emitting unit to emit light on the basis of the radio signal.

Further, when the light emitting pattern of the light emitting unit is held for each performance pattern in the costume 10, the wireless control device 20 may transmit information for identifying the performance pattern to the costume 10. This makes it possible for the costume 10 to perform the performance by the performance unit 16 on the basis of the information for identifying the performance pattern, and to control the light emission of each light emitting unit.

<Conclusion>

According to the first embodiment described above, the operator 2 can control the performance pattern of the costume 10 while confirming a reaction (a movement of a body, and emotion appearing in facial expression) of the audience user 4 to the performance of the costume 10 in the event venue 3, and transmit an instruction regarding the performance to the terminal device 50 of the performer wearing the costume 10.

Further, it is possible to detect the audience user 4 near the event venue 3 to notify the operator 2 and the performer wearing the costume 10 of information according to a situation of game play of the audience user 4, and to perform performance according to a situation of the game play of the audience user 4. For example, as a method of detecting the audience user 4 near the event venue 3, it is possible to receive check-in to the event venue from the audience user 4. For example, when the audience user 4 enters the event venue 3, a two-dimensional code indicating the account of the user is generated in the game program operating in the terminal device 40A and displayed on the terminal device 40A. It is possible to specify information on a game account of the audience user 4 by reading the two-dimensional code in a terminal of a staff member in charge of reception in the event venue 3. In addition to this, the audience user 4 may have purchased a ticket from a website of a theme park or the like in advance in order to view the event in the event venue 3. When the audience user 4 purchases a ticket on the website, information on an account for logging in to the website may be required, and the ticket may be electronically displayed by a two-dimensional code or the like in the terminal device 40 of the audience user 4 (displayed on the display). It is possible for the processing server 30 or the like to manage information on the audience user 4 near the event venue 3 by a staff member managing entrance and exit in the event venue 3 reading information on the ticket displayed on the terminal device 40 of the audience user 4 and the two-dimensional code using a terminal of the staff. The wireless control device 20 can display a game progress situation (information on a level of a player, an operating character, possessed characters, possessed game item, or the like) of a game account that has performed check-in on the display 24 on the basis of a result of the check-in. Further, the wireless control device 20 can notify the terminal device 50A of the performer wearing the costume 10 of information on the game progress situation of the game account that has performed the check-in.

In addition to this, the wireless control device 20 may determine the performance pattern of each costume 10 according to a progress situation of the game on the basis of the information on the game account of the audience user 4 near the event venue 3, regardless of the operation of the operator 2, and may notify the terminal device 50A of the performer of an instruction of performance content according to the progress situation of the game. This processing will be described in other embodiments.

Second Embodiment

In a second embodiment, (i) an example in which the wireless control device 20 controls the performance pattern of the costume 10 according to a position of each of the plurality of costumes 10 will be described. This makes it possible to control the performance of the event or the like without the operation of the operator 2.

(ii) Further, an example in which the performance pattern of the costume 10 is controlled according to the position of the audience user 4 who views the event or the like will be described. With the above configuration, it is possible to control the performance according to the reaction of the audience user at a venue of an event or the like.

(iii) Further, an example in which there are buildings around the event venue 3 and flying objects flying around the event venue 3, in addition to the costume 10, as performance control targets of the wireless control device 20, will be described.

(iv) An example in which it is detected that the audience user 4 holding specific goods (goods 4A or the like) is located around the costume 10, the performance unit 16 of the costume 10 is caused to perform a specific performance, and the terminal device 50A of the performer wearing the costume 10 is notified of information on the audience user 4 will be described. In this example, an example in which the processing server 30 or the like detects that the audience user 4 with specific goods has performed an operation of moving the specific goods (an operation of shaking the body as if giving an item to the costume 10, and an operation of shaking the body as if throwing an object against the costume 10) and executes, for example, the performance of the costume 10 according to the detection will be described.

(v) Example in which it is detected that the audience user 4 associated with specific information (for example, the audience user 4 having a game account of the game server 9, or the audience user 4 purchasing a character item or the like related to the costume 10 on an EC site or the like) is located around the costume 10 to thereby cause the performance unit 16 of the costume 10 to perform the specific performance, and the terminal device 50A of the performer wearing the costume 10 is notified of the information on the audience user 4 will be described. In this example, an example in which the processing server 30 or the like detects that the audience user 4 performs an operation on the basis of the program on the terminal device 40A and receives a predetermined input operation (for example, an operation using a game item) from the audience user 4, to thereby execute, for example, the performance of the costume 10 will be described.

(vi) Example in which the audience user 4 is notified of information on the costume 10, in addition to the example in which the performance is performed by the performance unit 16 of the costume 10 and the performer of the costume 10 is notified of information as described above, will be described. For example, a history of the performance of the costume 10 is accumulated as a database, so that the audience user 4 is notified of the fact that the costume 10 of the event venue 3 is the specific costume 10 (being the costume 10 that the audience user 4 viewed in the past). Further, the audience user 4 is notified of the fact that a performer wearing the costume 10 is a performer that the audience user 4 has viewed in the past. This makes it possible for the audience user 4 to experience the performance of the costume 10 in a theme park or the like more richly.

(vii) Example in which a plurality of audience users 4 are assigned to the plurality of respective costumes 10 and the audience users 4 are notified of information on the assigned costumes 10 will be described. This makes it possible for the audience user 4 to experience the performance of the costume 10 more richly in the theme park or the like, and theme park side can also predict a movement of audience users who will gather around each of the costumes 10 and perform performance in the event venue 3 smoothly. As a result, it is possible to enrich the experience of the audience user 4.

Figure 5:
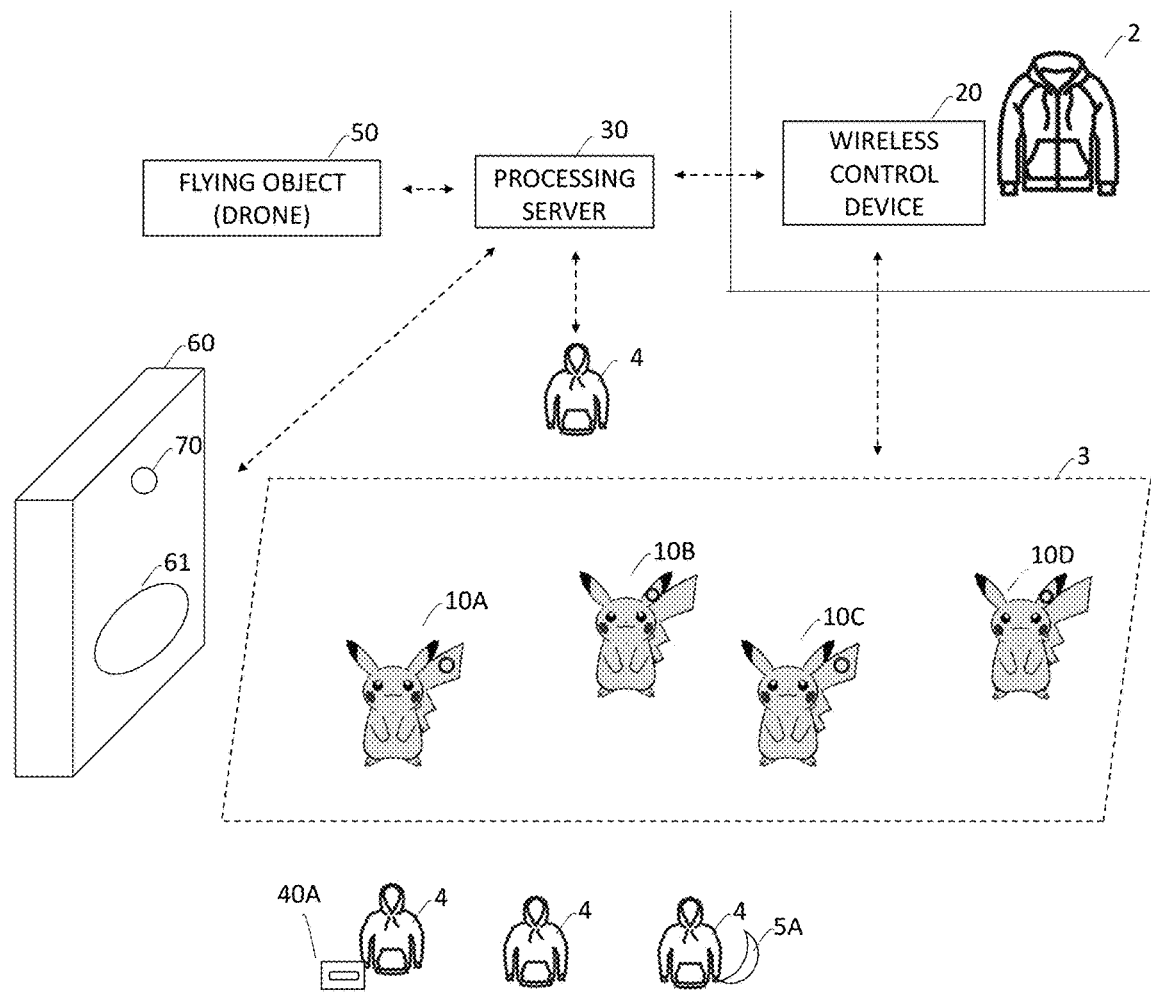
FIG. 5 is a diagram illustrating an overall configuration of a performance control system in a second embodiment.

FIG. 5 is a diagram illustrating an overall configuration of the performance control system in the second embodiment.

As illustrated in FIG. 5, a building 60 is disposed around the event venue 3. The building 60 includes a performance unit 61. The performance unit 61 includes, for example, a light emitting unit, a display, and a speaker. Further, a flying object 55 is flying above the event venue 3. The flying object 55 is, for example, one or a plurality of drones. The flying object 55 includes a light emitting unit that radiates laser light, or the like. The flying object 55 includes a camera, and photographs the costume 10 in the event venue 3 and the audience user 4 around the costume 10 from the sky.

The processing server 30 acquires the sensing result of each device (the flying object 55, a camera 70, or the like) sensed at these event venues 3. The processing server 30 detects the audience user 4 holding a specific goods (for example, goods sold in the past or present inside a theme park or the like) on the basis of the sensing result. The processing server 30 may recognize specific goods on the basis of the sensing result, determine performance content of the costume 10 on the basis of a type of recognized goods, a time when the goods can be purchased, and the like, and perform the performance using the wireless control device 20, and may determine content of which the terminal device 50 of the performer wearing the costume 10 is notified, and notify the terminal device 50 of the determined content.

For example, in the terminal device 50, information on a type of goods held by the audience user 4 around the costume 10 (for example, whether goods are goods of a certain character), and a time when the goods can be purchased (for example, whether the goods are goods related to an event being held in the theme park or the like) may be displayed to the performer.

The processing server 30 may acquire a history of the audience user 4 visiting the event venue 3, a facility having the event venue 3, and the like by specifying the audience user 4, and the audience user 4 may cause the terminal device 50 to display information on a place in which the performance of the costume 10 is performed (a place such as the event venue 3), a history of visiting the facility, or a history of visiting the event in which the performance of the costume 10 is performed. This makes it possible for the performer to ascertain how much the audience user 4 shows an attachment to the character or the like and then provide the performance of a movement by the costume 10.

The processing server 30 may notify the terminal device 50 of information based on a history of an operation of the audience user 4 in a program (a game program or the like) operating in the terminal device 40A or the like (for example, a situation in which the user causes a game to progress according to an operation in the game based on the game program). This makes it possible for the performer to ascertain a progress situation of the audience user 4 in a program in which, for example, a character of the costume 10 appears (how much a player level has been raised, how much a character level has been raised, and which character is being used) and then provide performance of a movement by the costume 10.

Further, the terminal device 40A of the audience user 4 and the terminal device 50 of the performer wearing the costume 10 may communicatively connect to each other through short-range wireless communication or the like to notify the terminal device 50 of the information on the audience user 4. For example, the terminal device 40A or the terminal device 50 can detect other nearby terminal devices by transmitting a beacon signal.

The wireless control device 20 can control the performance using the performance unit 61 in the building 60. That is, the performance unit 61 in the building 60 has a configuration equivalent to the wireless receiver 12 or the like as described in the first embodiment, to thereby perform, for example, light emitting of a light emitting unit according to the radio signal transmitted from the wireless control device 20.

The wireless control device 20 can control the performance using a performance unit of the flying object 55. For example, the wireless control device 20 controls a performance such as radiation of laser light from the flying object 55 to the event venue 3.

In the second embodiment, the performance control system includes a detection device that detects, for example, positions of the plurality of costumes 10, the position of the audience user 4, and the reaction of the audience user 4 watching the event or the like.

Positions of the costume 10 and the audience user 4 may be acquired by an image captured by the camera or a position information sensor.

For example, the position of the costume 10 may be specified by mounting a global positioning system (GPS) sensor on each of the costumes 10. Further, when the position information sensor is mounted on the terminal of the audience user 4, the position of the audience user 4 may be specified on the basis of an output of the position information sensor of the terminal.

For example, the camera 70 is installed in the building 60. The camera 70 can detect the positions of the plurality of costumes 10 in the event venue 3. The positions of the plurality of costumes 10 may be detected by photographing the event venue 3 using a camera included in the flying object 55 and analyzing a captured image.

Further, the camera 70 may be able to detect a position of a specific audience user 4 included in a photographing area by photographing the audience user 4 or detect the number of an unspecified number of audience users 4. This makes it possible to detect a position in which the audience users 4 gather in the event venue 3. For example, because the position in which the audience users 4 gather can be said to be a position in which the audience user 4 is highly interested in the event or the like, it is possible to specify the content of the performance in which the audience user 4 has a high reaction in a composition of the event or the like during or after the event.

The reaction of the audience user 4 watching the event or the like may be detected on the basis of the captured image of the camera or sound.

It is possible to detect the reaction of the audience user 4 watching the event or the like by photographing the audience user 4 using the camera 70 or the like. For example, it is possible to determine a line of sight of the audience user 4 and emotion of the audience user 4 on the basis of the captured image of the camera 70 or the like, and to specify content in which the audience user 4 has a high reaction in the performance of the event or the like. The reaction of the audience user 4 may be detected by photographing an entire area including the event venue 3 with a camera included in the flying object 55. Further, a method of detecting the reaction of the audience user 4 may be realized by detecting a voice of the audience user 4, in addition to the example in which the captured image is used. For example, a microphone or the like is installed around the event venue 3, thereby making it possible to detect, for example, cheers of the audience user 4.

<Functional Configuration>

Figure 6:
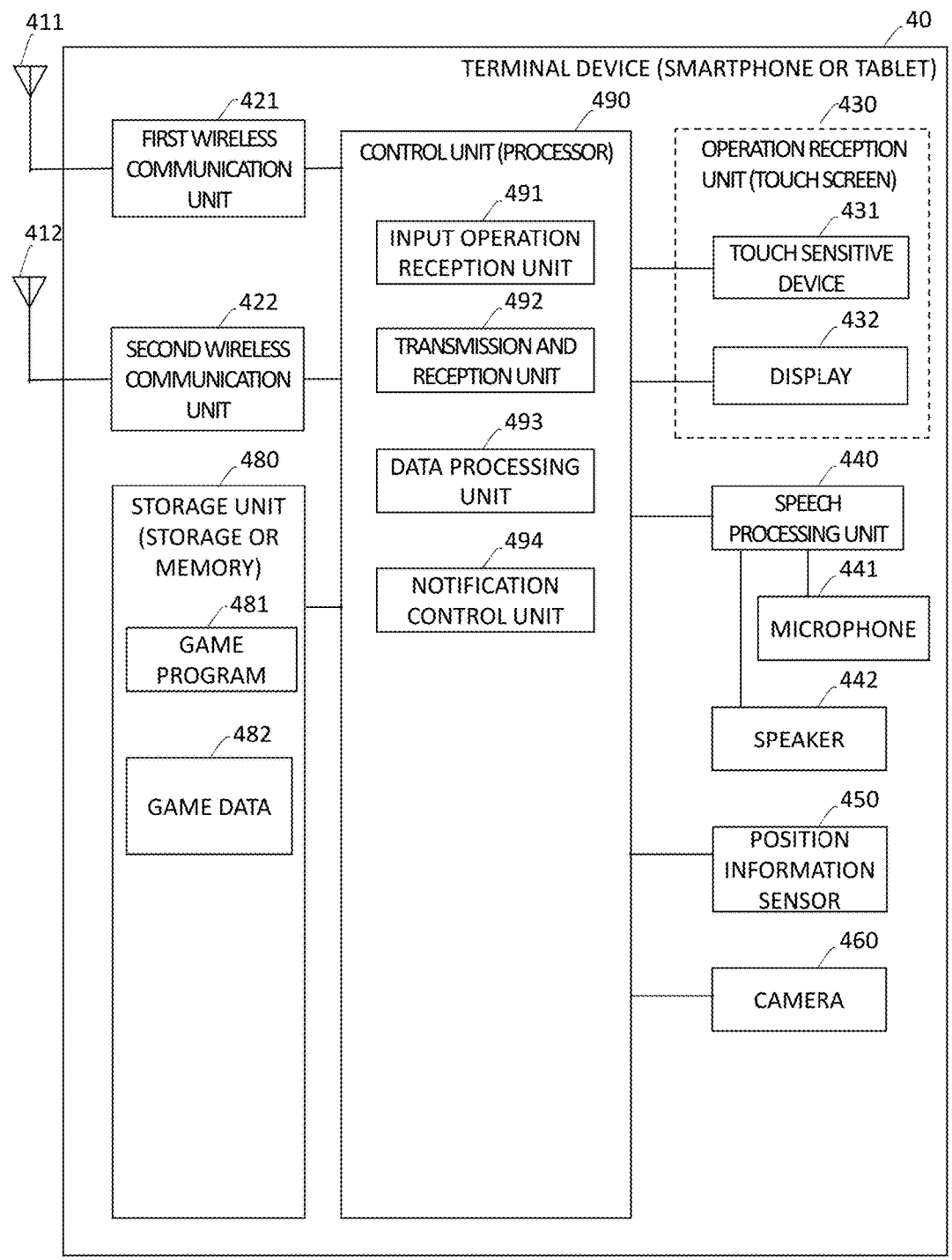
FIG. 6 is a block diagram of a terminal device 40 of an audience user 4.

FIG. 6 is a block diagram of the terminal device 40 of the audience user 4. As illustrated in FIG. 6, the terminal device 40 includes a plurality of antennas (an antenna 411 and an antenna 412), wireless communication units (a first wireless communication unit 421 and a second wireless communication unit 422) corresponding to the respective antennas, an operation reception unit 430 (including a touch sensitive device 431 and a display 432), a speech processing unit 440, a microphone 441, a speaker 442, a position information sensor 450, a camera 460, a storage unit 480, and control unit 490. The terminal device 40 also has functions and configurations (for example, a battery for holding power, a power supply circuit for controlling the supply of power from the battery to each circuit, and the like). As illustrated in FIG. 6, respective blocks included in the terminal device 40 are electrically connected by a bus or the like.

The antenna 411 radiates a signal generated by the terminal device 40 as radio waves. Further, the antenna 411 receives radio waves from a space and gives a received signal to the first wireless communication unit 421.

The antenna 412 radiates the signal generated by the terminal device 40 as radio waves. Further, the antenna 412 receives radio waves from the space and gives a received signal to the second wireless communication unit 422.

Because the terminal device 40 communicates with other wireless devices, the first wireless communication unit 421 performs modulation or demodulation processing for transmitting or receiving signals via the antenna 411. Because the terminal device 40 communicates with other wireless devices, the second wireless communication unit 422 performs, for example, modulation or demodulation processing for transmitting or receiving signals via the antenna 412. The first wireless communication unit 421 and the second wireless communication unit 422 are communication modules including a tuner, a received signal strength indicator (RSSI) calculation circuit, a cyclic redundancy check (CRC) calculation circuit, a high frequency circuit, and the like. The first wireless communication unit 421 and the second wireless communication unit 422 perform modulation or demodulation and frequency conversion of the radio signal transmitted or received by the terminal device 40, and give the received signal to the control unit 490.

The operation reception unit 430 has a mechanism for receiving an input operation of the user. Specifically, the operation reception unit 430 is configured as a touch screen, and includes the touch sensitive device 431 and the display 432. The touch sensitive device 431 receives an input operation of the user of the terminal device 40. The touch sensitive device 431 detects a contact position of the user with respect to a capacitive touch panel, for example, by using the capacitive touch panel. The touch sensitive device 431 outputs a signal indicating the contact position of the user detected by the touch panel to the control unit 490 as an input operation.

The display 432 displays data such as an image, a moving image, and text according to the control of the control unit 490. The display 432 is realized by, for example, a liquid crystal display (LCD) or an organic electro-luminescence (EL) display.

The speech processing unit 440 performs modulation or demodulation on an audio signal. The speech processing unit 440 modulates the signal given from the microphone 441, and gives a signal after modulation to the control unit 490. Further, the speech processing unit 440 gives the audio signal to the speaker 442. The speech processing unit 440 is realized by, for example, a processor for speed processing.

The microphone 441 receives an audio input and gives an audio signal corresponding to the audio input to the speech processing unit 440. The speaker 442 converts the audio signal given from the speech processing unit 440 into sound and outputs the sound to the outside of the terminal device 40.

The position information sensor 450 is a sensor that detects a position of the terminal device 40, and is, for example, a global positioning system (GPS) module. The GPS module is a reception device that is used in a satellite positioning system. The satellite positioning system receives signals from at least three or four satellites, and detects a current position of the terminal device 40 having the GPS module mounted thereon, on the basis of the received signals. For example, in a game based on a game program 481, the terminal device 40 can display a list of friends near the user on the display 432 when a position of the user registered as a friend can be referred to.

The camera 460 is a device for receiving light using a light reception element and outputting the light as a captured image. The camera 460 is, for example, a depth camera capable of detecting a distance from the camera 460 to a photographing target.

The storage unit 480 is configured by, for example, a flash memory, and stores data and programs to be used by the terminal device 40. In a certain aspect, the storage unit 480 stores the game program 481 and game data 482. The terminal device 40 provides the game to the audience user 4 by reading and executing the game program 481. The game data 482 is various types of data that are used in the game, and includes the information on the game account of the audience user 4, the player level, a character that is an operation target, possessed characters, and other information.

The control unit 490 controls the operation of the terminal device 40 by reading the program stored in the storage unit 480 and executing instructions included in the program. The control unit 490 is, for example, an application processor. The control unit 490 exhibits functions of an input operation reception unit 491, a transmission and reception unit 492, a data processing unit 493, and a notification control unit 494 by operating according to the program.

The input operation reception unit 491 performs processing for receiving the input operation of the user with respect to an input device such as the touch sensitive device 431. The input operation reception unit 491 discriminates a type of operation, such as whether an operation of the user is a flick operation, a tap operation, a drag (swipe) operation, or the like on the basis of information of coordinates at which the user touches the touch sensitive device 431 with a finger or the like.

The transmission and reception unit 492 performs processing for the terminal device 40 transmitting or receiving data to or from an external device such as the processing server 30 and the game controller according to a communication protocol.

The data processing unit 493 performs a calculation on data received by the terminal device 40 according to a program, and performs processing for outputting a calculation result to a memory or the like.

The notification control unit 494 performs processing for displaying a display image on the display 432, processing for outputting sound to the speaker 442, and processing for generating vibration in the camera 460.

<Configuration of Processing Server 30>

Figure 7:
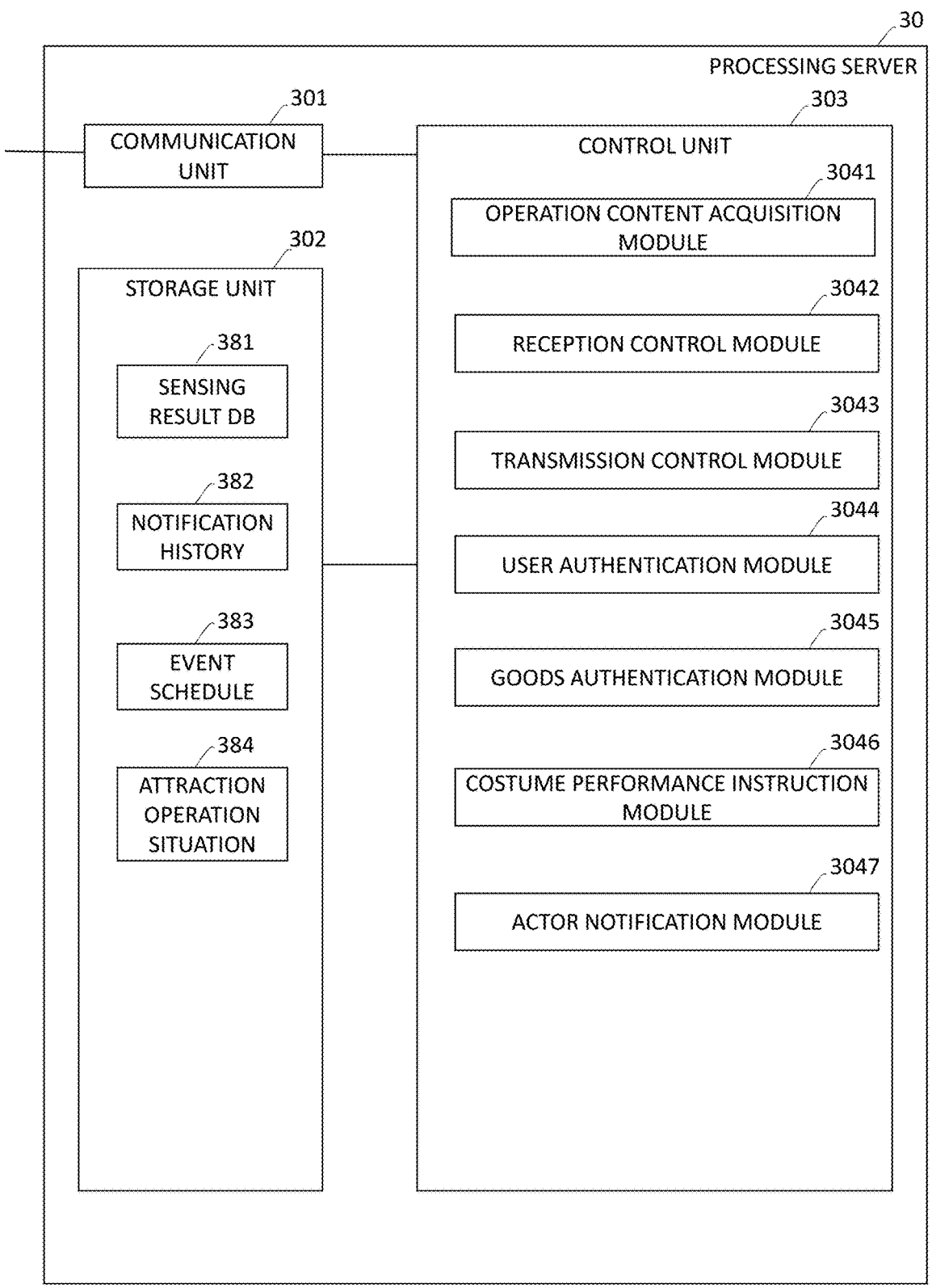
FIG. 7 is a diagram illustrating a functional configuration of a processing server 30.

FIG. 7 is a diagram illustrating a functional configuration of the processing server 30. As illustrated in FIG. 7, the processing server 30 exhibits functions of a communication unit 301, a storage unit 302, and a control unit 303.

The communication unit 301 performs processing for the processing server 30 communicating with an external device such as the terminal device 40.

The storage unit 302 stores data and programs that are used by the processing server 30. The storage unit 302 stores the sensing result database 381, a notification history 382, an event schedule 383, an attraction operation situation 384, and the like.

The sensing result database 381 is a database for holding sensing results of, for example, various cameras for sensing the costume 10, the audience user 4, the goods 5 held by the audience user 4, and the like in the event venue 3. Details will be described herein.

The notification history 382 is a database for holding a history of notifications to the costume 10 and the terminal device 50 of the performer, and a reaction of the audience user 4 to these notifications. Details will be described herein.

The event schedule 383 indicates a schedule in which an event is held in the event venue 3 or the like, and includes a schedule in which the performance is performed by the costume 10.

The attraction operation situation 384 includes information on an operation situation of an attraction, a show, or the like that can be entered (whether or not the attraction, the show, or the like is operating), and a congestion situation (a waiting time or the like) at a theme park or the like in which there is the event venue 3 or the like.

The control unit 303 exhibits functions of various modules by the processor of the processing server 30 performing processing according to a program.

An operation content acquisition module 3041 acquires operation content of the user. The operation content acquisition module 3041 acquires, for example, operation content of the audience user 4 in the terminal device 40, operation content of the performer in the terminal device 50, and operation content of the operator 2 of the wireless control device 20.

A reception control module 3042 controls processing for the processing server 30 receiving a signal from an external device according to a communication protocol.

A transmission control module 3043 controls processing for the processing server 30 transmitting a signal to an external device according to a communication protocol.

A user authentication module 3044 specifies a user around the costume 10. The user authentication module 3044 recognizes a person (the audience user 4) through image recognition, for example, on the basis of a sensing result (photographing result of the event venue 3 or the like) shown in the sensing result database 381. The user authentication module 3044 specifies the user, for example, by acquiring information on the game account of the user from the terminal device 40 around the event venue 3.

The user authentication module 3044 detects that the user holds the goods and performs a predetermined operation, in a case in which the user holds the goods, on the basis of the sensing result database 381. For example, information on goods specified by a goods authentication module 3045 to be described herein (information such as a type of goods held by the user and a sales time of the goods), and an operation of the user in a state in which the user holds the goods (an operation of shaking his or her arm or hand by which the goods is held, and an operation of the user holding the goods and performing a predetermined pose) are associated and stored in the processing server 30 in advance. The user authentication module 3044 detects that the user holding the goods has pertained a predetermined operation with the specific goods on the basis of the sensing result database 381. The terminal device 50 of the performer may be notified of a result of the detection by an actor notification module 3047 to be described herein. Further, a costume performance instruction module 3046 to be described herein may determine a pattern of the performance by the performance unit 16 of the costume 10 on the basis of a detection result, and cause the performance unit 16 to perform the performance via the wireless control device 20. Accordingly, because the performance of the costume 10 is changed by the audience user 4 performing a specific operation in a state in which the audience user 4 holds the goods, the experience of the audience user 4 can be further enriched.

The user authentication module 3044 detects that communication with the terminal device 40 is performed, and that the audience user 4 associated with specific information (for example, information on a game account of a game provided by the game server 9) has performed a predetermined operation (for example, has performed an operation using a specific game item, and an operation with respect to a specific game character in the game based on the game program 481) on the basis of the sensing result database 381. The performance of the costume 10 may be made to be performed through the processing of the costume performance instruction module 3046 and the actor notification module 3047 as described above, on the basis of the detection result.

The goods authentication module 3045 specifies the goods held by the user around the event venue 3. The goods authentication module 3045 recognizes goods through image recognition, for example, on the basis of the sensing result shown in the sensing result database 381. The goods authentication module 3045 specifies a type of recognized goods, a sales time, or the like through collation with a database of goods associated with an appearance of the goods, a sales time of the goods, and the like.

The costume performance instruction module 3046 determines the content of the performance by the performance unit 16 of the costume 10, and causes the performance unit 16 to execute the performance. The costume performance instruction module 3046 transmits a signal indicating the content of the performance of the costume 10 to the wireless control device 20, thereby causing the wireless control device 20 to cause the performance unit 16 of the costume 10 to execute a performance corresponding to the content of the performance.

The actor notification module 3047 notifies the terminal device 50 of the performer of the costume 10 of the information.

<Data Structure>

A data structure of various types of data stored in the wireless control device 20 or the like according to the second embodiment will be described.

FIG. 8 is a diagram illustrating a data structure of the sensing result database 381 and the notification history 382. As illustrated in FIG. 8, the sensing result database 381 holds a history of a position of the costume, a history of the position of the user, and a history of specifying of goods.

For example, the processing server 30 stores the sensing result database 381 and the notification history 382 in the storage 33.

As illustrated, respective records of the sensing result database 381 include an item "sensor ID", an item "date and time", an item "sensing data", an item "user specifying result", an item "goods specifying result", and an item "costume specifying result".

The item "sensor ID" is information for identifying each of sensor devices (including a camera for obtaining a two-dimensional captured image, and a camera for measuring a distance to a detection target and obtaining point group data, and the like) that sense a place (event venue 3) at which the costume 10 performs performance, such as the camera mounted on the flying object 55 and the camera 70 installed in the building 60.

The item "date and time" indicates a timing at which sensing has been performed by the sensor device.

The item "sensing data" indicates sensing data that is a result of sensing in the sensor device.

The item "user specifying result" indicates a result of specifying the user by performing predetermined processing such as image recognition on the sensing data. The result of specifying the user includes, for example, a user name for identifying the user, a position of the user (for example, coordinates at which the user is located in the event venue 3), and a reaction of the user (emotions such as happiness can be determined on the basis of a facial expression (a movement of facial muscles of eyes, mouth, or the like) of the user included in a captured image). When the user agrees to use a captured face image as personal information in a site including the event venue 3 in advance, the user name may be specified on the basis of a face of the user included in the sensing data.

For example, when a captured image of a face is registered as authentication of a person in an admission ticket for a theme park or the like, the user may agree to use of data of the captured image of the face in order to provide information in the theme park to the user in the theme park or the like. In this case, the processing server 30 can specify information on a user registered in advance on the basis of the sensing data.

Further, when a place at which the sensor device shown in the item "sensor ID" is disposed and a range of sensing are determined in advance, the position of the user in the theme park or the like can be specified on the basis of a range in which the user has been detected in the sensing data. Further, for example, the position of the user included in the sensing data may be defined by a latitude and longitude of a position in which the sensor device is disposed.

The item "goods specifying result" indicates a result of specifying the goods by performing processing such as image recognition on the sensing data. The result of specifying the goods includes information for specifying the user who holds the goods, and information for specifying a type of goods, a sales time, and the like.

The item "costume specifying result" indicates a result of specifying the costume by performing processing such as image recognition on the sensing data. The result of specifying the costume includes information indicating a character indicated by the costume. For example, the processing server 30 can specify the character indicated by the costume on the basis of the sensing data by referring to a database in which an appearance of the costume and a character name are associated with each other. Further, when a place in which the event is held, information for specifying each of costumes appearing in the event (unique information may be associated with each of costumes of the same character), and information for specifying a performer wearing the costume (a name of the performer, code for identifying the performer, or the like) are associated in the event schedule 383 in advance, the processing server 30 may refer to the event schedule 383 to acquire information on the costume that performs a performance at a timing when the event is held in the event venue 3, thereby specifying the costume. As described above, the result of specifying the costume includes information for specifying each costume, information on the position of the costume, and information on an actor wearing the costume.

Respective records of the notification history 382 include an item "date and time", an item "content of performance instruction to the costume", an item "content of notification to the terminal of the actor", and an item "reaction (emotion)".

The item "date and time" indicates a timing when the processing server 30 has performed a performance instruction to the performance unit 16 of the costume 10, or a timing when the processing server 30 has pertained a notification to the terminal device 50 of the performer wearing the costume 10.

The item "content of performance instruction to the costume" indicates content in which the processing server 30 has instructed the performance pattern of the performance unit 16 of the costume 10.

The item "content of notification to the terminal of the actor" indicates content of a notification that the processing server 30 has transmitted to the terminal device 50. The content of the notification includes instruction content indicating a performance to be performed by the performer.

The item "reaction (emotion)" indicates the reaction of the audience user 4. As the reaction of the audience user 4, a reaction "Good" indicating that the reaction of the audience user 4 is good, a reaction "Normal" indicating that the reaction of the audience user 4 is normal, a reaction "Bad" indicating that the reaction of the audience user 4 is low, and the like may be set. For example, it is possible to determine the emotion of the audience user 4 on the basis of the image taken by the camera. Further, it is possible to determine the reaction of the audience user 4 on the basis of a voice detection result in the event venue 3 (for example, a loudness of the cheers of the audience user 4). That is, the wireless control device 20 may determine the emotion of the audience user 4 on the basis of the captured image or the voice data.

FIG. 9 is a diagram illustrating a data structure of a user information 181 and a friend list 184 stored in the game server 9.

As illustrated in FIG. 9, respective records of user information 981 include an item "user identification information (user ID)", an item "user name", an item "user level", an item "possessed character", an item "possessed item", an item "game play history", an item "game play time", an item "paid virtual currency" for respective pieces of information for identifying users. In the user information 981, a current value and a maximum value of a stamina value of the user may be managed.

The item "user identification information (user ID)" is information for identifying each user.

The item "user name" is a name set by the user.

The item "user level" is a parameter that increases separately from a level of the game character or the like by the user repeating the game play.

The item "possessed character" indicates information on the game character possessed by the user. For example, the item indicates information on characters that can be operated by the user when characters that are operation targets are appropriately added by being associated with user information in a game. In the item "possessed character", for example, information such as a level of the character and equipment items are also included.

The item "possessed item" indicates information on the game item possessed by the user.

The item "game play history" indicates a history of the user having played the game. For example, when the user causes the game to progress, the item includes information on a history of use of a character serving as an operation target among a plurality of characters possessed by the user. For example, the item includes information such as the number of times the user has fought with a character that is an operation target as a player character, and the number of times a game unit also called a quest has been cleared. The processing server 30 can evaluate how continuously the audience user 4 is playing the game by referring to a game play history of the audience user 4.

The item "game play time" indicates a time in which the user has played the game. For example, a history in which the user has progressed the game together with the character serving as an operation target is included. The processing server 30 receives game data corresponding to the game account of the audience user 4 from the game server 9, thereby making it possible for the audience user 4 to designate a certain character as an operation target and acquire a sum of a time in which the game play has been performed, and to extract candidates for game characters to which the audience user 4 will particularly show attachment.

The item "paid virtual currency" indicates an amount of a virtual currency given to the user for a fee, which is held by the user. For example, the terminal device 10 imparts a paid virtual currency to the user by receiving processing for purchasing the paid virtual currency, through purchase processing.

Respective records of a friend list 984 include an item "user 1", an item "user 2", an item "friend registration date", an item "multi-play history", an item "message transmission and reception history", and the like.

The item "user 1" indicates one of users registered as friends.

The item "user 2" indicates the other user among the users registered as friends.

The item "friend registration date" indicates a date and time when users are registered as friends.

The item "multi-play history" indicates a history of users registered as friends performing multi-play. For example, information for specifying a game unit played by multi-play, a date and time of playing, and information on a result of playing (whether or not the game is cleared, a clear time, or the like) are included as the history.

The item "message transmission and reception history" indicates a history of messages that users registered as friends have transmitted or received.

As a friend registration method, when one user applies for friend registration to another user and the other user approves the application, the user may be registered in the friend list. Further, one user may be able to add (follow) a friend to the list without approval of other users. In this case, both users follow each other, resulting in a mutual follow state.

Further, as the friend registration method, a plurality of users may be all registered in the friend list on condition that the users are located in the event venue 3 (for example, the users check in at the event venue 3 using a game account). This makes it possible for users having all experienced the performance of the costume 10 together in the event venue 3 to be registered as friends.

<Operation>
(1) Example in Which the Performance by the Performance Unit 16 of the Costume 10 is Controlled Hereinafter, an example in which the audience user 4 holds the goods 5 and the costume 10 is made to perform a performance in response to reception of an input operation of the audience user 4 will be described.

(1-1) Example in Which the Costume 10 is Made to Perform Performance According to the Goods 5

Figure 10:
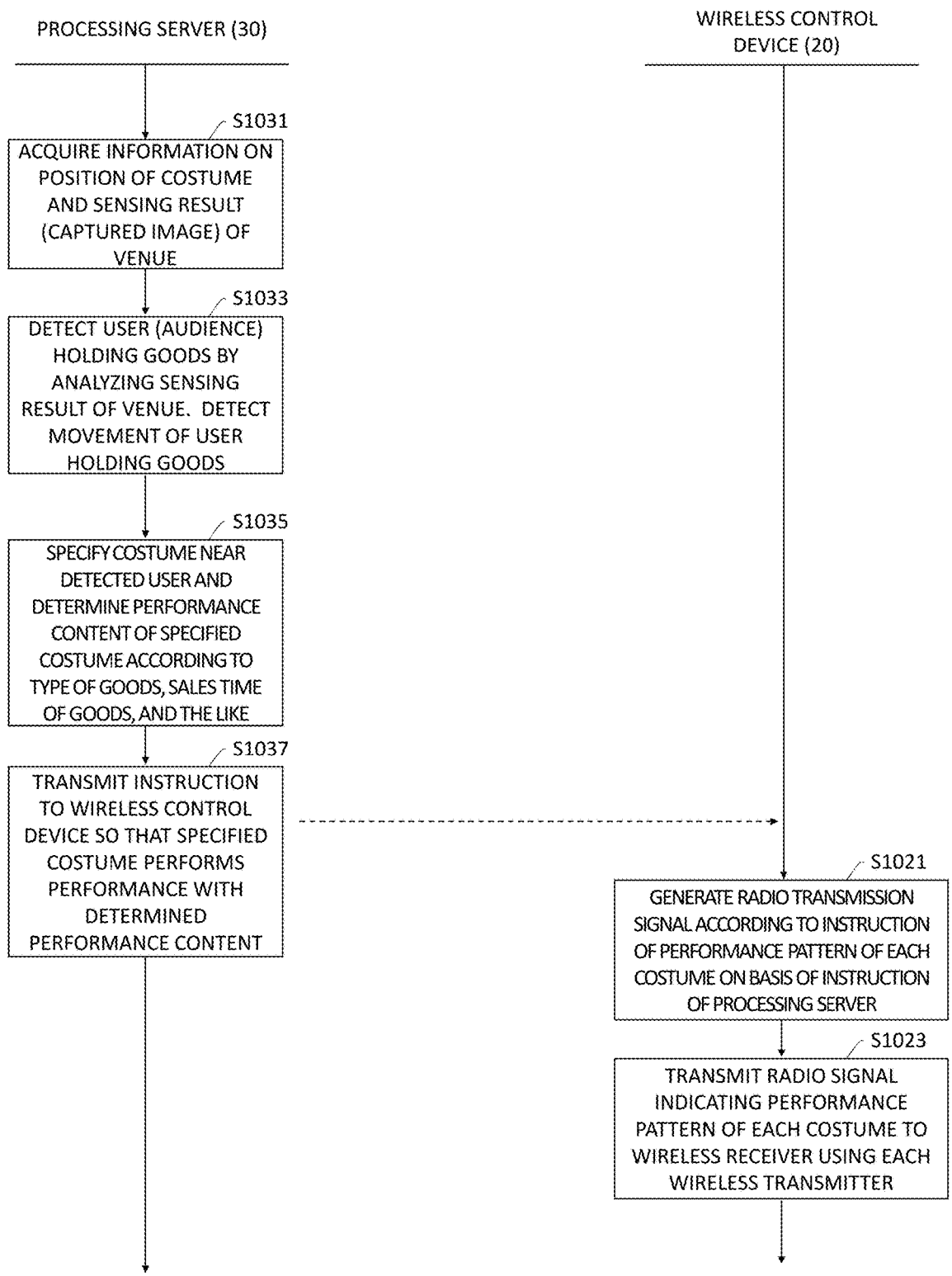
FIG. 10 is a flowchart illustrating an operation of each device in a case in which a performance of the costume 10 is controlled by detecting the audience user 4 holding goods 5.

FIG. 10 is a flowchart illustrating an operation of each device in a case in which the performance of the costume 10 is controlled by detecting the audience user 4 holding the goods 5.

In step S1301, the processing server 30 acquires information on the position of the costume 10 and a sensing result (captured image) of the event venue 3 and updates the sensing result database 381.

In step S1033, the processing server 30 analyzes the sensing result of the event venue 3 on the basis of the sensing result database 381, to thereby detect the audience user 4 holding the specific goods 5 (the audience user 4 holding some goods in the hand and wearing on the body or a predetermined type of goods). The processing server 30 detects a movement of the user holding the goods 5 (an operation such as holding the goods in the hand and shaking his or her arm).

In step S1035, the processing server 30 specifies the costume 10 near the detected user on the basis of the sensing result database 381. The processing server 30 determines performance content of the specified costume 10 according to a type of goods 5, a sales time of the goods 5, and the like. For example, when a plurality of patterns of performance by the performance unit 16 of the costume 10 are prepared, it is possible to provide the audience user 4 with a performance corresponding to the goods 5 specified on the basis of the sensing result database 381 by associating and holding the performance patterns according to the type of goods 5, the sales time of the goods 5, or the like.

In step S1037, the processing server 30 transmits an instruction to the wireless control device 20 so that the specified costume 10 performs performance with the performance content determined in step S1035. The processing server 30 updates the notification history 382 on the basis of the content of the instruction to the wireless control device 20.

In step S1021, the wireless control device 20 generates a radio transmission signal according to the designation of the performance pattern of each costume 10 on the basis of an instruction of the processing server 30.

In step S1023, the wireless control device 20 transmits a radio signal indicating the performance pattern of each costume 10 to the wireless receiver 12 using each wireless transmitter 22.

As described above, the audience user 4 can enjoy a different performance in a case in which the goods 5 are not held and by holding the goods 5. Further, the processing server 30 determines the performance pattern of the performance unit 16 of the costume 10 according to a time when the audience user 4 has purchased the goods 5. This makes it possible to enjoy a different performance as compared with a case in which there are no goods that the audience user 4 purchased in the past.

(1-2) Example in Which the Costume 10 is Made to Perform Performance According to the Input Operation of the Audience User 4

Figure 11:
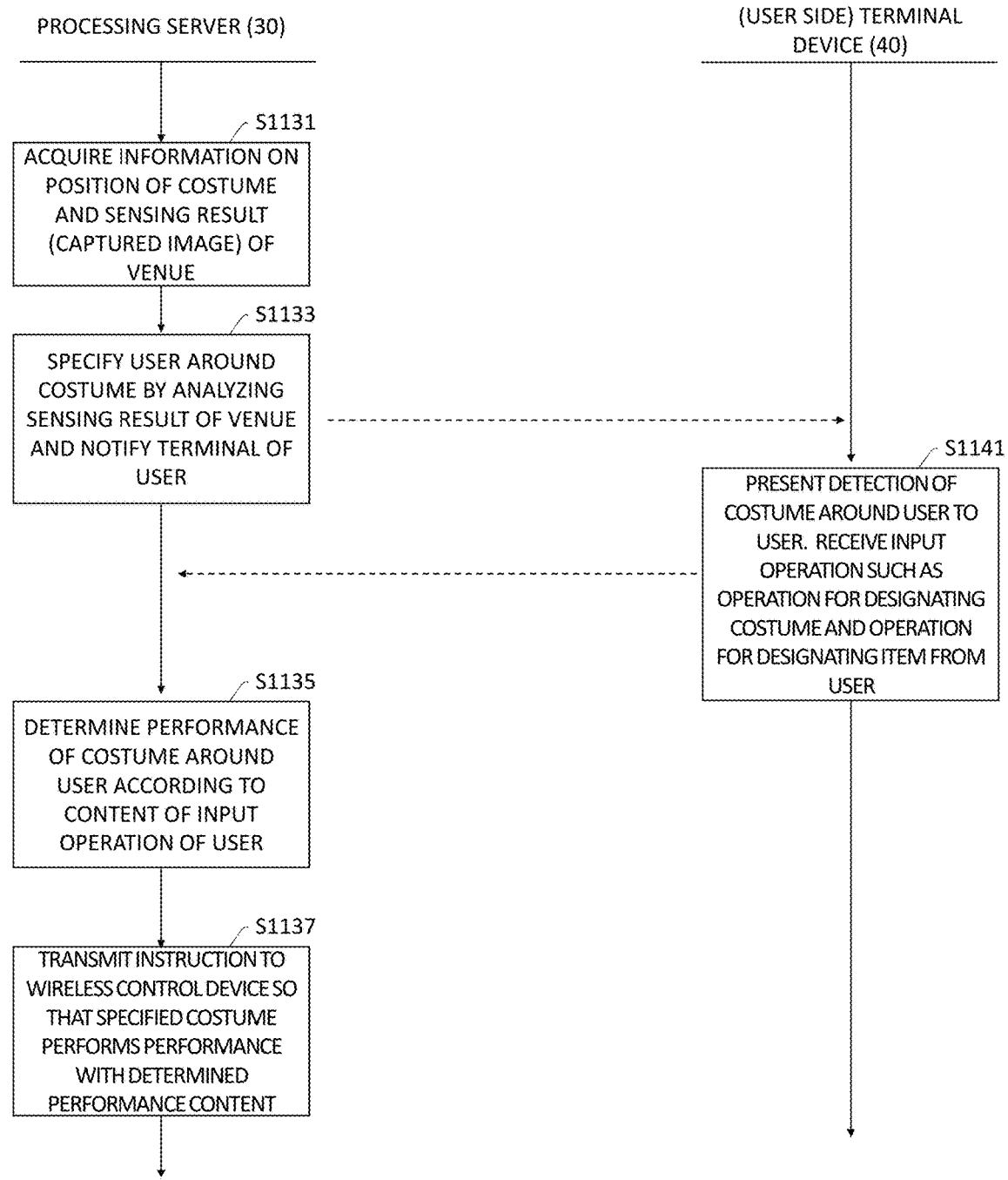
FIG. 11 is a flowchart illustrating an operation of each device in a case in which the performance of the costume 10 is controlled by the terminal device 40 receiving an input operation of the audience user 4.

FIG. 11 is a flowchart illustrating an operation of each device in a case in which the performance of the costume 10 is controlled, by the terminal device 40 receiving the input operation of the audience user 4. For example, the terminal device 40 can execute a performance according to a given item using the performance unit 16 of the costume 10 by receiving an input operation for giving the item to a character from the audience user 4 in a program (the game program, or the like) operating in the terminal device 40.

In step S1131, the processing server 30 acquires the information on the position of the costume 10 and the sensing result (captured image) of the event venue 3, and updates the sensing result database 381.

In step S1133, the processing server 30 specifies the audience user 4 around the costume 10 by analyzing the sensing result of the event venue 3 on the basis of the sensing result database 381, to thereby notify the terminal device 40 of the audience user 4 of the audience user 4 being specified.

In step S1141, the terminal device 40 presents to the audience user 4 that the costume 10 around the audience user 4 has been detected. The terminal device 40 receives input operations such as an operation for designating the costume 10 and an operation for designating an item from the audience user 4 by executing a program such as the game program.

In step S1135, the processing server 30 determines the performance of the costume 10 around the audience user 4 according to content of the input operation of the audience user 4. For example, the processing server 30 determines the performance pattern of the costume 10 according to a type of game item designated by the audience user 4 in step S1141.

In step S1137, the processing server 30 transmits an instruction to the wireless control device 20 so that the costume 10 specified in step S1131 or the like performs performance with performance content determined in step S1135.

(1-3) Example in Which a Motivation for the Performer to Perform a Specific Performance is Provided by Notifying the Terminal Device 50 of the Performer of the Content of the Input Operation of the Audience User 4

Figure 12:
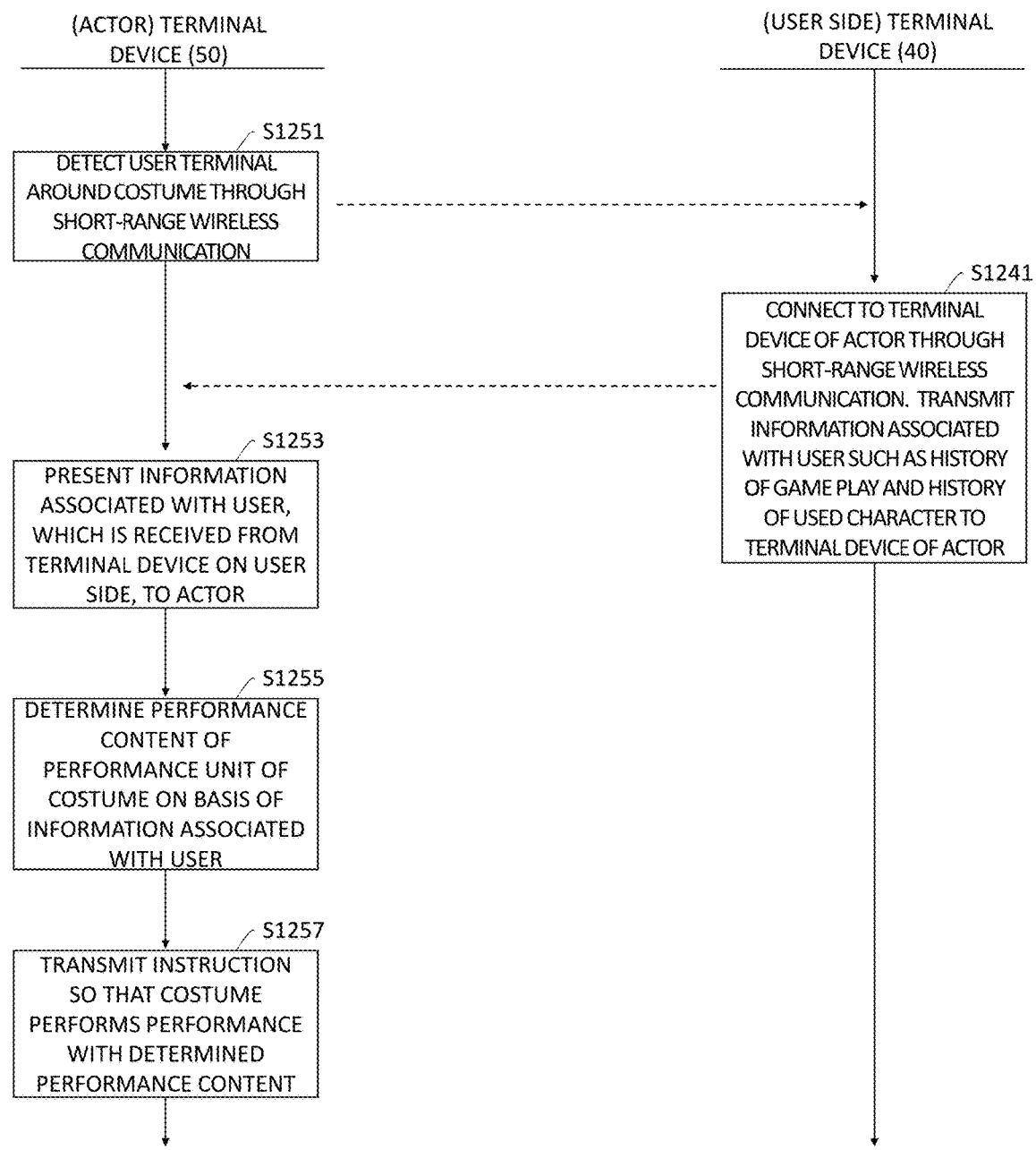
FIG. 12 is a diagram illustrating an operation example of each device in a case in which a performer is notified of information on the audience user 4.

FIG. 12 is a diagram illustrating an operation example of each device in a case in which the performer is notified of the information on the audience user 4.

In step S1251, the terminal device 50 detects the terminal 40 of the audience user 4 around the costume 10 through short-range wireless communication such as Wi-Fi (registered trademark) or Bluetooth (registered trademark).

In step S1241, the terminal device 40 is connected to the terminal device 50 of the performer by short-range wireless communication. The terminal device 40 transmits information associated with the user, such as a history of game play and a history of used characters, to the terminal device 50 of the performer.

In step S1253, the terminal device 50 presents information associated with the audience user 4 received from the terminal device 40 on the audience user 4 side to the display 432 of the terminal device 40 of the performer. For example, the information associated with the audience user 4 includes information on achievement (the user information 981) in which the audience user 4 has used the program such as the game program. For example, the terminal device 50 displays notification content based on each piece of information shown in the user information 981 (for example, "a user with a specific user name is located near the costume 10", "a character indicated by the costume 10 is used as an operation character in a game", or the like).

In step S1255, the terminal device 50 determines the content of the performance by the performance unit 16 of the costume 10 on the basis of the information associated with the audience user 4 (the user information 981).

In step S51257, the terminal device 50 transmits an instruction to the wireless control device 20 so that the costume 10 performs the performance with the determined performance content.

(2) Example in Which Audience User 4 is Notified of Information

Hereinafter, an example in which the audience user 4 experiences the performance of the costume 10 more richly by notifying the audience user 4 of the information on the costume 10 will be described.

(2-1) Example in Which the Audience User 4 is Notified of an Individual Difference Among the Costume 10

Figure 13:
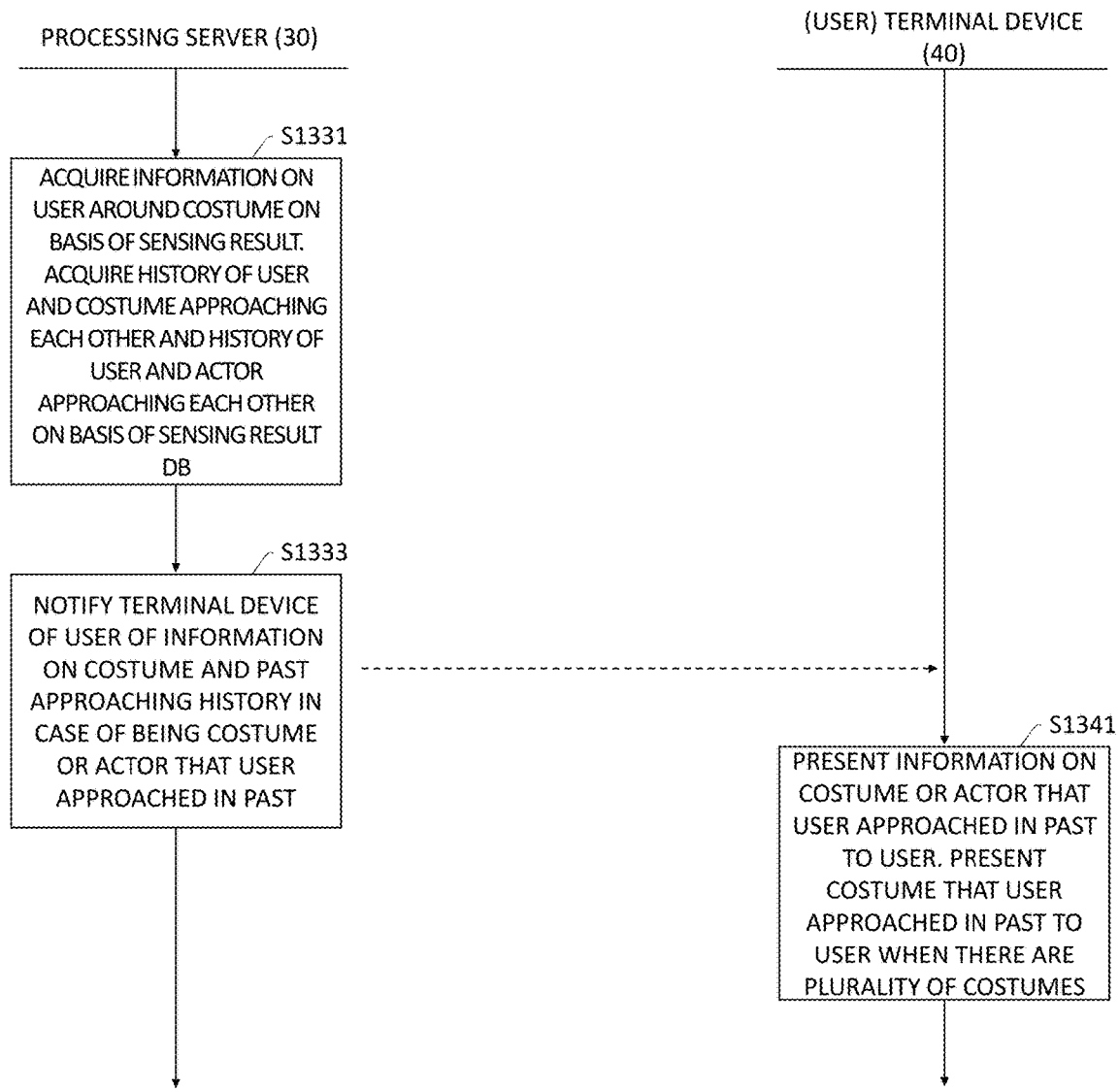
FIG. 13 is a diagram illustrating an operation example of each device in a case in which an individual difference among a plurality of costumes 10 is expressed and the audience user 4 is notified of the individual difference.

FIG. 13 is a diagram illustrating an operation example of each device in a case in which an individual difference among the plurality of costumes 10 is expressed and the audience user 4 is notified of the individual difference.

In step S1331, the processing server 30 acquires the information on the audience user 4 around the costume 10 on the basis of the sensing result (the sensing result database 381). The processing server 30 acquires a history of the audience user 4 and the costume 10 approaching each other and a history of the audience user 4 and the performer approaching each other, on the basis of the sensing result database 381.

In step S1333, in a case of being the costume 10 or the performer that the audience user 4 approached in the past, the processing server 30 refers to the sensing result database 381 to notify the terminal device 40 of the audience user 4 of the information on the costume 10 and a history of past approaching.

In step S1341, the terminal device 40 presents the information on the costume 10 or the performer who the audience user 4 approached in the past to the audience user 4. When there are the plurality of costumes 10 in the event venue 3, the terminal device 40 presents the costume 10 who the audience user 4 approached in the past (for example, a character name indicated by the costume 10) to the audience user 4. For example, when there are a plurality of costumes 10 corresponding to a specific character, the terminal device 40 displays information on a history of the audience user 4 having approached the costumes 10 corresponding to the character in the past. Further, the terminal device 40 presents information associated with an individual of each costume to the user on the basis of the identification information (costume ID) of each costume 10. For example, the terminal device 40 may display a costume ID, a type of character shown in the costume, an identification number (serial number or the like) indicating an individual difference among the costumes, and parameters set for a character corresponding to the costume (for example, settings of a height and a weight) so that these can be confirmed by the user. A size of each costume 10, for example, may be designed to reflect parameters (height, weight, fighting power, or the like) set for such a character. That is, in a case in which a large character is set, the costume 10 can also be relatively large. This makes it possible for the audience user 4 to experience an event as if there are an individual difference even though a plurality of costumes 10 are costumes of the same type of character in a case in which the plurality of costumes 10 appear for the same type of characters.

As described above, the audience user 4 can recognize that there is a costume 10 related to the audience user 4 in the past among the plurality of costumes 10 in the event venue 3, and the experience of the audience user 4 in the theme park or the like in which the event venue 3 is installed is further enriched.

(2-2) Example in Which the Audience User 4 is Assigned to Each of the Plurality of Costumes 10

The processing server 30 may assign (match) a plurality of audience users 4 in the event venue 3 to the plurality of costumes 10 in the event venue 3 on the basis of the sensing result database 381. As described above, the terminal device 40 of each audience user 4 is notified of the costume 10 among the plurality of costumes 10 that has been assigned to the audience user 4. For example, when the audience user 4 approaches the assigned costume 10, the processing server 30 may communicate with the game server 9 to impart a privilege (a game item or the like) in a game provided by the game server 9 or perform a special performance using the performance unit 16 of the costume 10. This makes it possible to assign the audience user 4 to each of the plurality of costumes 10, and provide a special experience to each user while preventing occurrence of congestion in advance when a large number of audience users 4 gather in the event venue 3.

Figure 14:
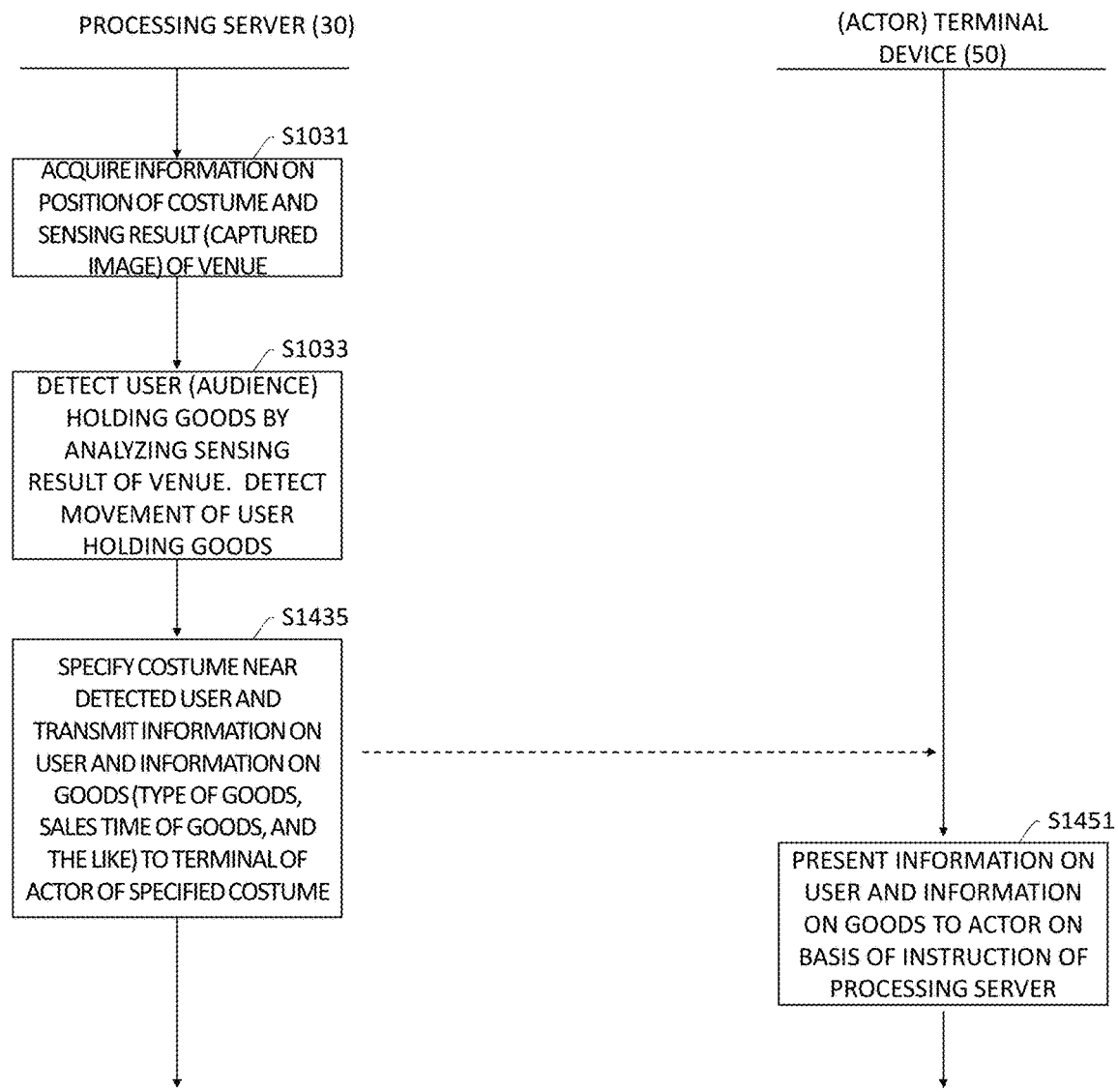
FIG. 14 is a diagram illustrating an operation example of each device in a case in which the performer is notified of information on an audience user 4 holding goods among audience users 4 around the costume 10.

(3) Example in Which the Performer of the Costume 10 is Notified of Information (3-1) Example in Which the Performer is Notified of the Fact that there is the Audience User 4 Holding the Goods FIG. 14 is a diagram illustrating an operation example of each device in a case in which the performer is notified of the information on the audience user 4 holding the goods among the audience users 4 around the costume 10.

In step S1435, the processing server 30 specifies a costume near the detected user on the basis of the sensing result database 381, and transmits the information on the audience user 4 and information on the goods 5 (a type of goods, a release date of the goods, or the like) to the terminal device 50 of the performer of the specified costume.

In step S1451, the terminal device 50 presents the information on the audience user 4 and the information on the goods 5 to the performer on the basis of an instruction of the processing server 30 (displays each of these pieces of information on the display of the terminal device 50).

As described above, the performer can perform the performance by the costume 10 while referring to the information on the goods held by the audience user among the audience users 4 of the costume 10.

(3-2) Example in Which the Performer is Notified of a Progress Situation of the Game Play of the Audience User 4

In addition to this, the processing server 30 acquires the progress situation of the game play of the audience user 4 by communicating with the game server 9, and notifies the terminal device 50 of the performer of information on the progress situation of the game play.

This makes it possible for the performer to perform the performance after ascertaining the progress situation of the game play of each audience user 4 around the costume 10.

Modification Example (1) In the terminal of the audience user 4, when a position of the terminal of the audience user 4 and the position of the costume 10 satisfy a predetermined condition, the terminal of the audience user 4 may be able to execute specific processing. For example, the terminal of the audience user 4 may acquire the position of the costume 10 from the wireless control device 20. Further, photographing may be performed by a camera of the terminal of the audience user 4 and the costume 10 included in a captured image may be detected. Accordingly, when the position of the terminal of the audience user 4 and the position of the costume 10 are within a certain distance, for example, the user may be able to use a specific function in an application operating on the terminal of the audience user 4. For example, when the application operating on the terminal of the audience user 4 is a game program, the user may be able to acquire game content corresponding to a character of the costume 10 by the costume 10 being included in the captured image captured by the camera of the terminal of the audience user 4.

Further, a specific function such as battle may be available in the game program. For example, it is possible to play with a game character corresponding to the character of the costume 10 in the game program, by the costume 10 being included in the captured image captured by the camera of the terminal of the audience user 4. In this case, the game character can participate in a battle with a plurality of users detecting the costume 10 in the event venue 3. For example, the total number of users who can participate in the battle may be managed in the game program on the basis of a position of the costume 10 and a position of the terminal detecting the costume 10 among the terminals of the audience user 4.

As described in each of the above embodiments, according to each embodiment, because the processing server 30 can determine the performance pattern of each costume 10 at any time while observing the reaction of the audience user 4 watching, for example, the event of the event venue 3 and while observing the plurality of costumes 10 at the event venue 3 on the basis of the sensing result, it is possible to further improve an entertainment property of a show or event.

Supplements

The matters described in the respective embodiments will be supplemented hereinafter.

Supplement 1

According to an embodiment, an information processing device (30, 20) including a control unit (39) is provided. The control unit functions as a detection means (3044, 3045, S1033) configured to detect that a user (4) holding a specific item (5) or a user associated with specific information is located around a costume (10); and a performance control means (3046, 3047) configured to cause a performance unit (16) of the costume to perform a specific performance in response to the detection and notify an actor wearing the costume of information on the user associated with the specific information.

Supplement 2

The information processing device according to supplement 1, wherein the detection in the detection means includes detecting that the user has performed a first operation with specific goods (3044, 3045), and the performance control means causes the performance unit to perform the specific performance in response to detecting the first operation or notifies the actor wearing the costume of the information on the user (3046, 3047).

Supplement 3

The information processing device according to supplement 1, wherein the detection means detecting that the user associated with the specific information is located includes detecting that a program (481, 482) operating on a terminal (40) of the user has received a predetermined operation from the user (3044), and the performance control means causes the specific performance or the notification to be performed in response to detecting that the predetermined operation has been received (3046, 3047).

Supplement 4

The information processing device according to supplement 1, wherein the specific goods do not include a communication unit for communicating with other devices.

Supplement 5

The information processing device according to supplement 1, wherein the control unit further functions as a notification means (S1333, S1341) configured to notify the user detected by the detection means that the costume is a specific costume.

Supplement 6

The information processing device according to supplement 5, wherein the notification means notifies the user of the costume being the specific costume on the basis of a history of detection of the user around the costume (381).

Supplement 7

The information processing device according to supplement 5, wherein the performance is performed for the user by using a plurality of costumes, and the notification means determines, for each of a plurality of users around the plurality of costumes, a costume to be associated with the user among the plurality of costumes, and notifies the terminal (40) of each user of information on the determined costume as the specific costume.

Supplement 8

The information processing device according to supplement 1, wherein the detection means acquires a sensing result of a sensor around the costume and detects a user holding the specific goods on the basis of the sensing result (3044, 3045, 381).

Supplement 9

The information processing device according to supplement 1, wherein the performance control means performing the notification to the actor includes causing a terminal of the actor of the costume around the terminal of the user to receive a predetermined signal transmitted from a terminal of the user (S1241, S1141).

Supplement 10

The information processing device according to supplement 1, wherein the detection means acquires a sensing result of a sensor around the costume and recognizes the user on the basis of the sensing result (381, 3044), and the performance control means notifies a terminal of the actor of a position of the recognized user (381, 3047).

Supplement 11

The information processing device according to supplement 1, wherein the detection means detects a user holding the specific goods by detecting the specific goods, and the specific goods include goods that are able to be purchased at a place or facility at which the performance of the costume is performed, or goods that were able to be purchased in the past.

Supplement 12

The information processing device according to supplement 11, wherein the performance control means determines content of the performance of the performance unit of the costume on the basis of at least one of a type of detected specific goods and a time when the specific goods are able to be purchased.

Supplement 13

The information processing device according to supplement 11, wherein the performance control means notifies the actor of information on at least one of a type of detected specific goods and a time when the specific goods are able to be purchased (S1451).

Supplement 14

The information processing device according to supplement 1, wherein the performance control means notifies a terminal of the actor of information on a history of the user visiting a place or facility at which the performance of the costume is performed, or a history of the user visiting an event in which the performance of the costume is performed (381).

Supplement 15

The information processing device according to supplement 1, wherein the performance control means notifies a terminal of the actor of a history of operations of the user in a program operating on a terminal of the user (3044, 3047).

What is claimed is:

1. An information processing device, comprising:
    processing circuitry configured to
        detect that a user holding a specific item or a user associated with predetermined information is located around a costume,
        cause the costume to perform a specific performance in response to the detection, and
        notify an actor wearing the costume of information on a user associated with the predetermined information, wherein the information includes one or more of
            a history of the user visiting a location at which the specific performance of the costume is performed, and
            a history of the user visiting an event in which the specific performance of the costume is performed.

2. The information processing device according to claim 1, wherein the processing circuitry is further configured to
    detect that the user has performed a first operation with specific item, and
    cause the specific performance in response to detecting the first operation or notify the actor wearing the costume of the information on the user.

3. The information processing device according to claim 1, wherein the processing circuitry is further configured to
    detect that a program operating on a terminal of the user has received a predetermined operation from the user, and
    cause the specific performance or the notification to be performed in response to detecting that the predetermined operation has been received.

4. The information processing device according to claim 1, wherein the specific goods do not include a communication device for communicating with other devices.

5. The information processing device according to claim 1, wherein the processing circuitry is further configured to notify the user detected that the costume is a specific costume.

6. The information processing device according to claim 5, wherein the processing circuitry is further configured to notify the user of the costume being the specific costume based on a history of detection of the user around the costume.

7. The information processing device according to claim 5,
    wherein the performance is performed for the user by using a plurality of costumes, and
    the processing circuitry is further configured to determine, for each of a plurality of users around the plurality of costumes, a costume to be associated with the user among the plurality of costumes, and notify a terminal of each user of information on the determined costume as the specific costume.

8. The information processing device according to claim 1, wherein the processing circuitry is further configured to acquire a sensing result of a sensor around the costume and detect a user holding the specific goods based on the sensing result.

9. The information processing device according to claim 1, wherein the processing circuitry is further configured to cause a terminal of the actor of the costume around a terminal of the user to receive a predetermined signal transmitted from the terminal of the user.

10. The information processing device according to claim 1,
    wherein the processing circuitry is further configured to acquire a sensing result of a sensor around the costume and recognize the user based on the sensing result, and notify a terminal of the actor of a position of the recognized user.

11. The information processing device according to claim 1,
    wherein the processing circuitry is further configured to detect a user holding the specific goods by detecting the specific goods,
    wherein the specific goods include goods that are able to be purchased at a place or facility at which the performance of the costume is performed, or goods that were able to be purchased in the past.

12. The information processing device according to claim 11, wherein the processing circuitry is further configured to determine content of the performance of the costume based on at least one of a type of detected specific goods and a time when the specific goods were able to be purchased.

13. The information processing device according to claim 11, wherein the processing circuitry is further configured to notify the actor of information on at least one of a type of detected specific goods and a time when the specific goods were able to be purchased.

14. The information processing device according to claim 1, wherein the processing circuitry is further configured to notify a terminal of the actor of a history of operations of the user in a program operating on a terminal of the user.

15. A non-transitory computer-readable storage medium storing computer-readable instructions thereon which, when executed by a computer, cause the computer to a perform a method, the method comprising:
- detecting that a user holding a specific item or a user associated with predetermined information is located around a costume;
- causing the costume to perform a specific performance in response to the detection; and
- notifying an actor wearing the costume of information on the user associated with the predetermined information, wherein the information includes one or more of
  - a history of the user visiting a location at which the specific performance of the costume is performed, and
  - a history of the user visiting an event in which the specific performance of the costume is performed.

16. A method comprising:
- detecting, by processing circuitry of an information processing device, that a user holding a specific item or a user associated with predetermined information is located around a costume;
- causing, by the processing circuitry, the costume to perform a specific performance in response to the detection; and
- notifying an actor wearing the costume of information on the user associated with the predetermined information, wherein the information includes one or more of
  - a history of the user visiting a location at which the specific performance of the costume is performed, and
  - a history of the user visiting an event in which the specific performance of the costume is performed.

* * * * *